(12) United States Patent
Nagatomi et al.

(10) Patent No.: US 8,331,211 B2
(45) Date of Patent: Dec. 11, 2012

(54) OPTICAL PICKUP DEVICE

(75) Inventors: Kenji Nagatomi, Kaizu (JP); Shinsei Kasahara, Ota (JP); Shigeharu Shirane, Kumagaya (JP); Masayuki Yoshie, Oizumi-Machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/186,833

(22) Filed: Jul. 20, 2011

(65) Prior Publication Data

US 2012/0026857 A1 Feb. 2, 2012

(30) Foreign Application Priority Data

Jul. 30, 2010 (JP) .................................. 2010-172210

(51) Int. Cl.
*G11B 7/00* (2006.01)

(52) U.S. Cl. ............ 369/112.22; 369/112.28; 369/44.23; 369/44.42

(58) Field of Classification Search ............... 369/44.23, 369/44.41, 44.42, 112.28, 112.01, 112.09, 369/112.14, 112.21, 112.22
See application file for complete search history.

(56) References Cited

U.S. PATENT DOCUMENTS

| | | | | |
|---|---|---|---|---|
| 2002/0048233 A1* | 4/2002 | Ogasawara et al. | ......... | 369/44.23 |
| 2009/0201787 A1* | 8/2009 | Ogasawara et al. | ...... | 369/112.23 |
| 2009/0225645 A1 | 9/2009 | Nagatomi | | |
| 2009/0278029 A1* | 11/2009 | Ogasawara et al. | ......... | 250/201.5 |
| 2010/0027386 A1* | 2/2010 | Nagatomi et al. | ......... | 369/44.32 |
| 2010/0027404 A1* | 2/2010 | Nagatomi et al. | ....... | 369/112.23 |
| 2010/0027405 A1* | 2/2010 | Nagatomi et al. | ....... | 369/112.23 |
| 2010/0080106 A1 | 4/2010 | Nagatomi et al. | | |
| 2010/0177619 A1* | 7/2010 | Sato et al. | ................ | 369/112.23 |
| 2010/0182891 A1 | 7/2010 | Mamiya et al. | | |
| 2010/0271926 A1* | 10/2010 | Nagatomi | ................ | 369/112.23 |
| 2010/0329102 A1* | 12/2010 | Nagatomi | ................ | 369/112.23 |
| 2011/0026382 A1* | 2/2011 | Kanai et al. | ............... | 369/112.23 |
| 2011/0075544 A1* | 3/2011 | Nagatomi | ................ | 369/112.23 |
| 2011/0075545 A1* | 3/2011 | Nagatomi et al. | ....... | 369/112.23 |

FOREIGN PATENT DOCUMENTS

| | | |
|---|---|---|
| JP | 2006-73042 A | 6/2006 |
| JP | 2009-211770 A | 9/2009 |
| JP | 2010-102813 A | 5/2010 |
| JP | 2010-170598 A | 8/2010 |

* cited by examiner

*Primary Examiner* — Thang Tran

(74) *Attorney, Agent, or Firm* — Ditthavong Mori & Steiner, P.C.

(57) ABSTRACT

An optical pickup device has an astigmatism element which imparts astigmatism to reflected light of laser light reflected on a recording layer, and a spectral element into which the reflected light is entered, and which separates the reflected light. The spectral element is divided into six second areas by a straight line in parallel to a first direction, a straight line in parallel to a second direction, and a first area having a predetermined width and formed along a straight line in parallel to a third direction inclined from the first direction by 45 degrees. The spectral element is configured to guide the reflected light passing through the six second areas to corresponding sensors on a photodetector while making propagating directions of the reflected light different from each other, and to avoid guiding the reflected light entered into the first area to the sensors.

7 Claims, 19 Drawing Sheets

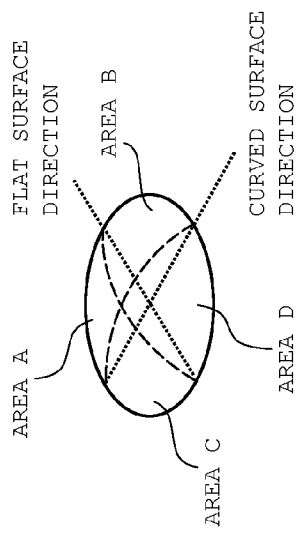
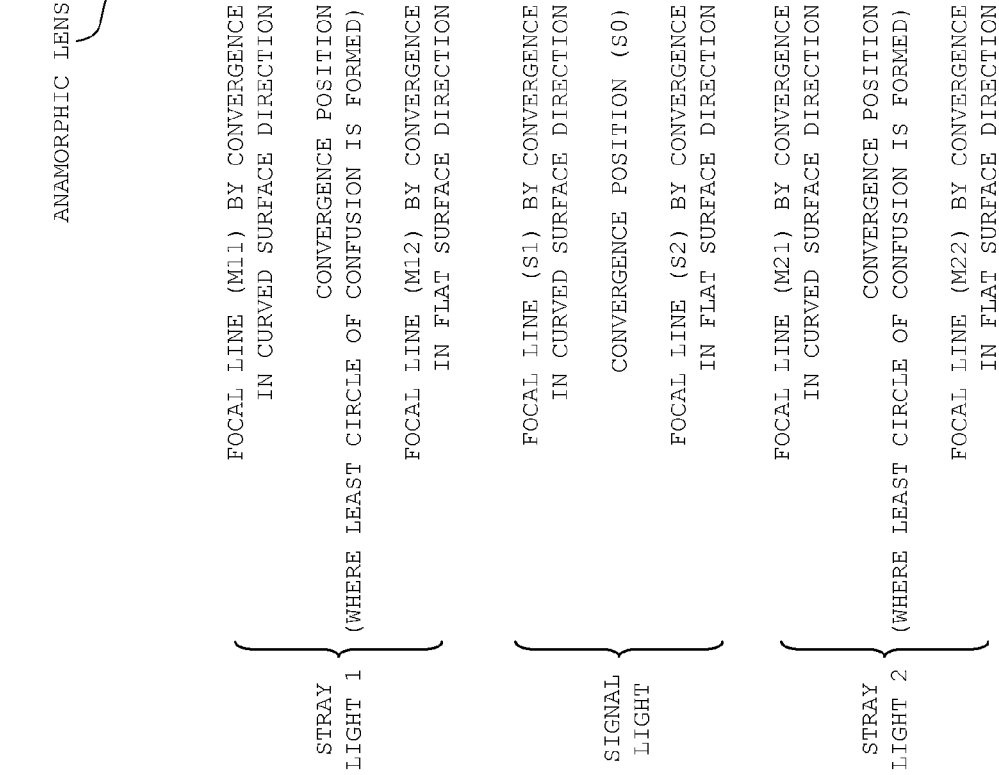

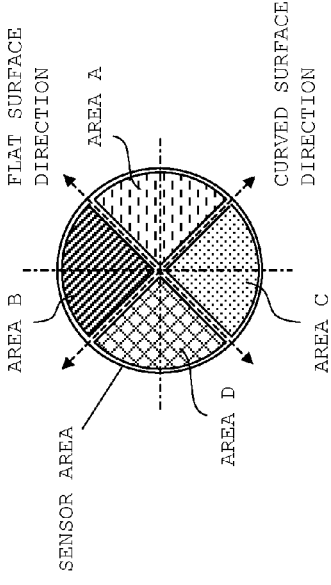
*FIG.2A* LIGHT FLUX DIVIDING PATTERN
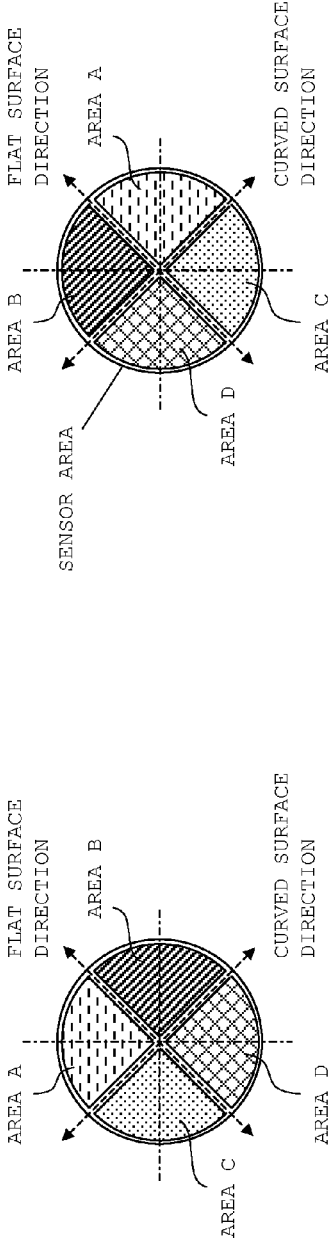
*FIG.2B* SIGNAL LIGHT
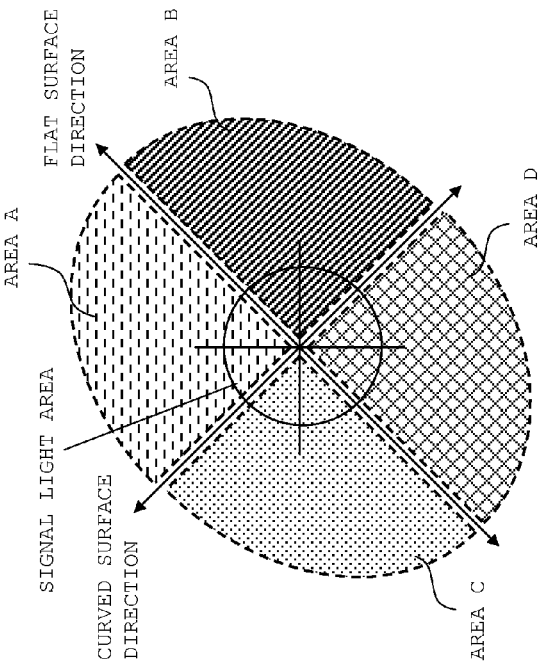
*FIG.2D* STRAY LIGHT 2
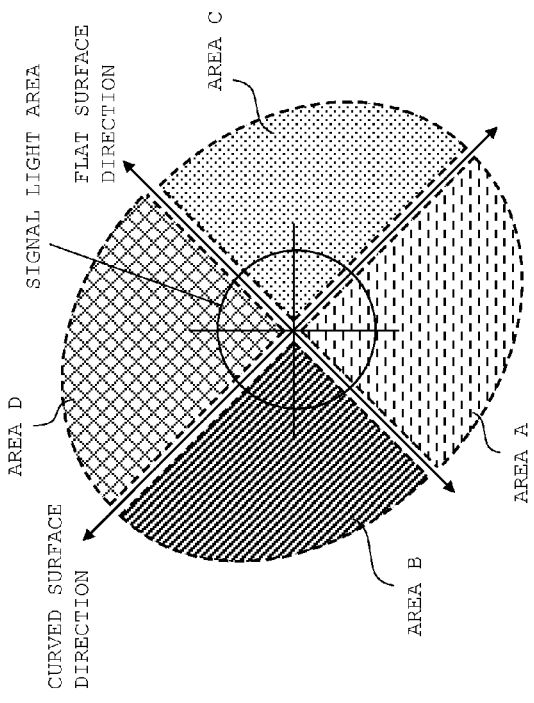
*FIG.2C* STRAY LIGHT 1

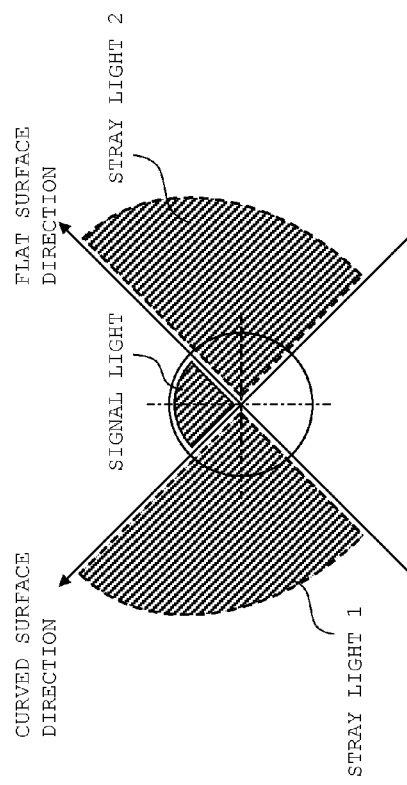
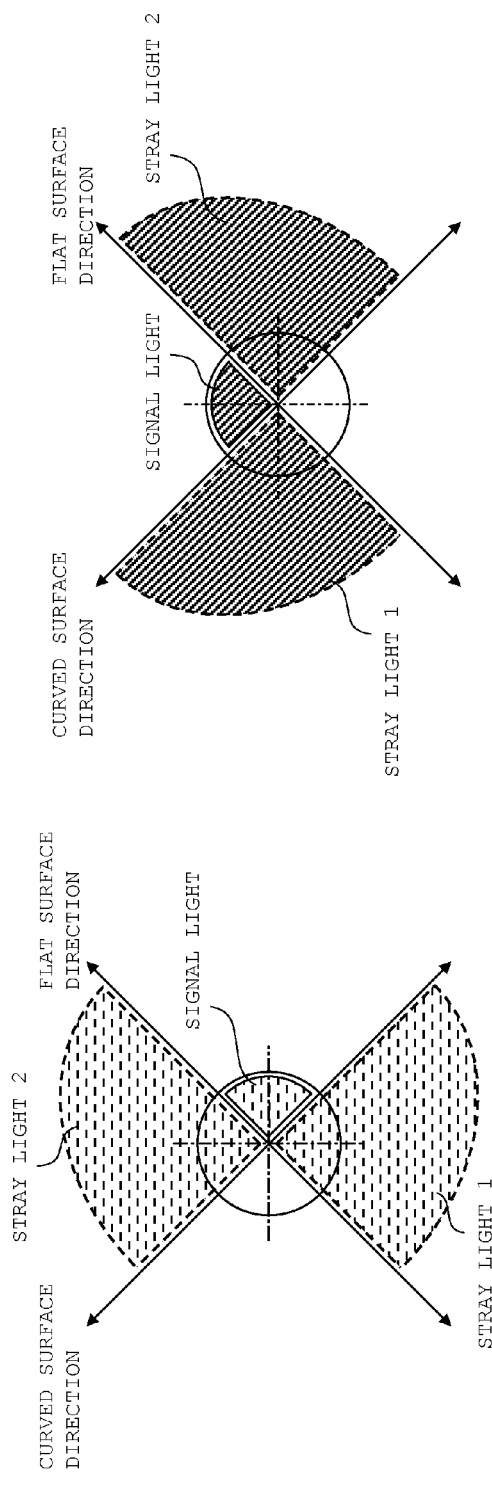
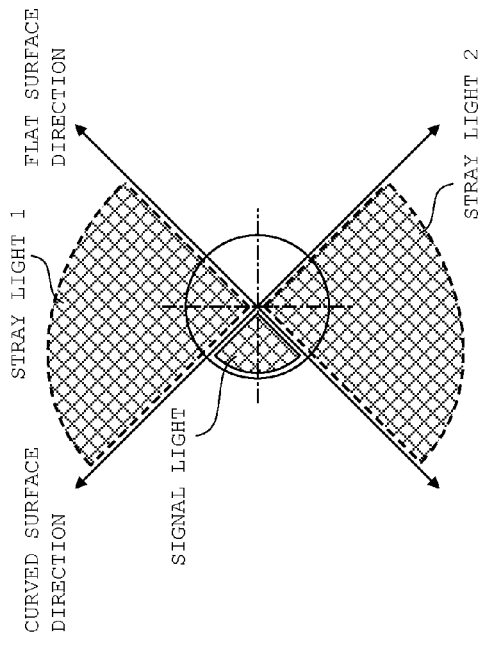
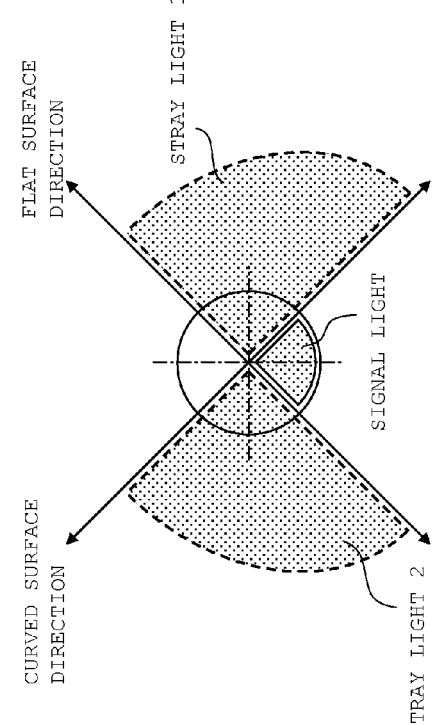

LIGHT FLUX ON PLANE S0

PROVIDE ANGULAR CHANGE TO EACH AREA

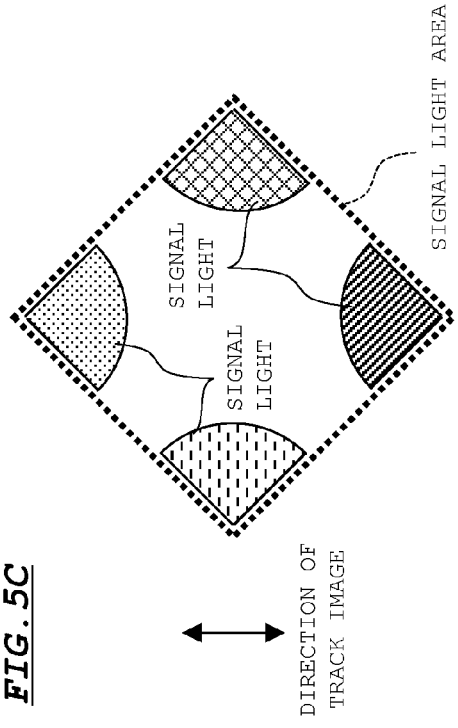
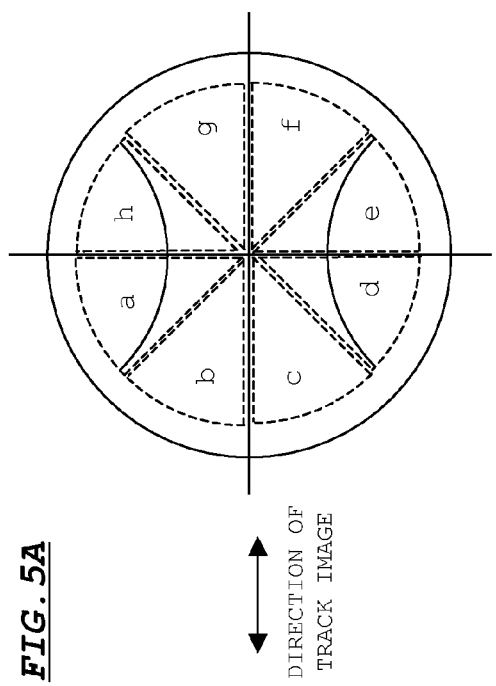
FIG. 5A  FIG. 5B  FIG. 5C  FIG. 5D
FE = (A+B+E+F) − (C+D+G+H)
PP = (A+B+G+H) − (C+D+E+F)

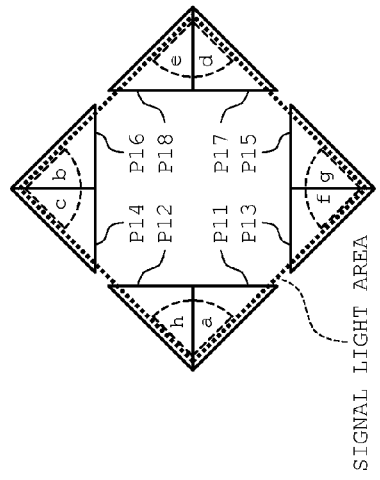
FIG. 7A
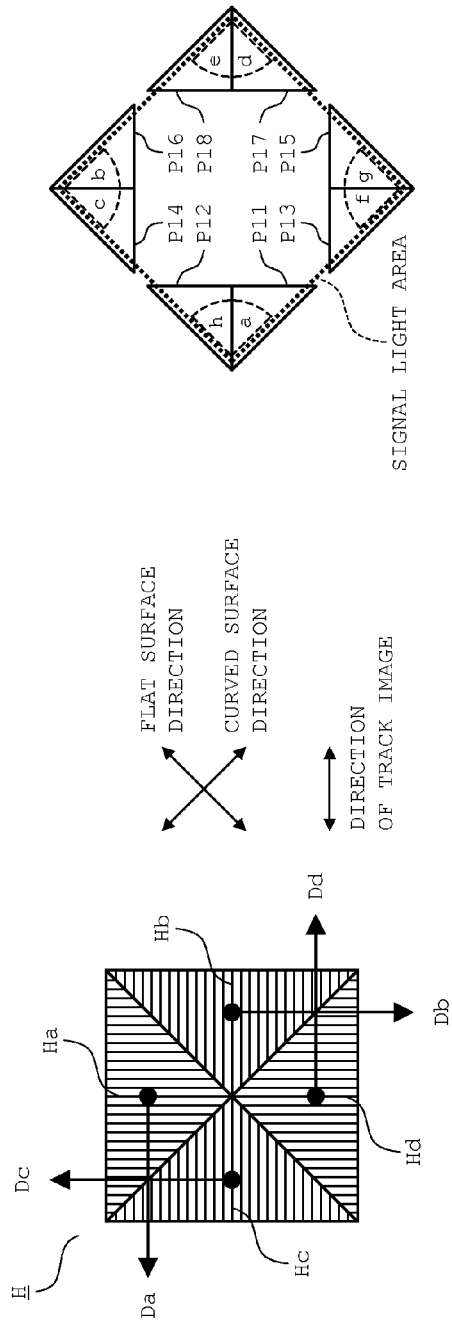
FIG. 7B SIGNAL LIGHT
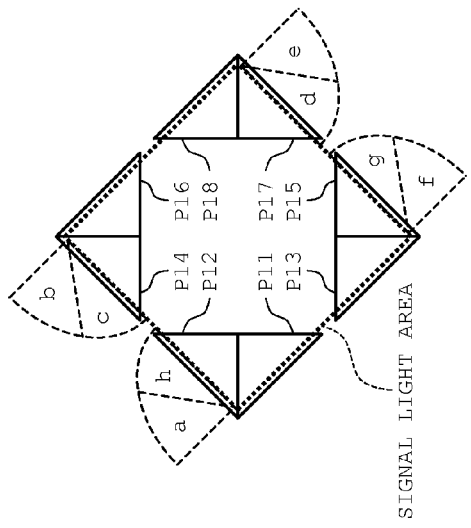
FIG. 7D STRAY LIGHT 2
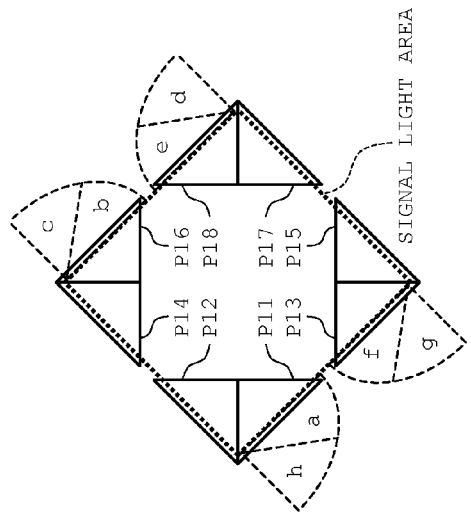
FIG. 7C STRAY LIGHT 1

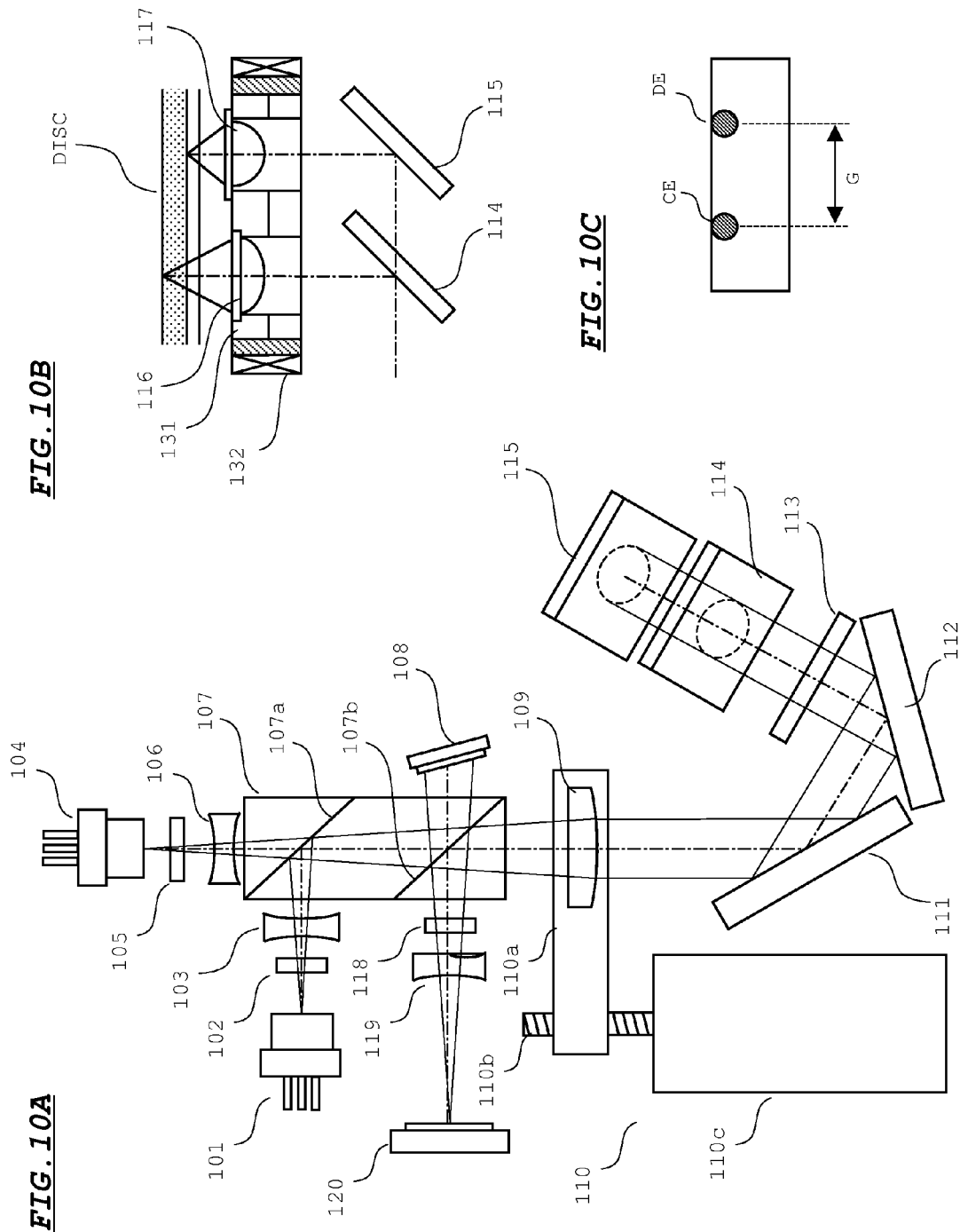

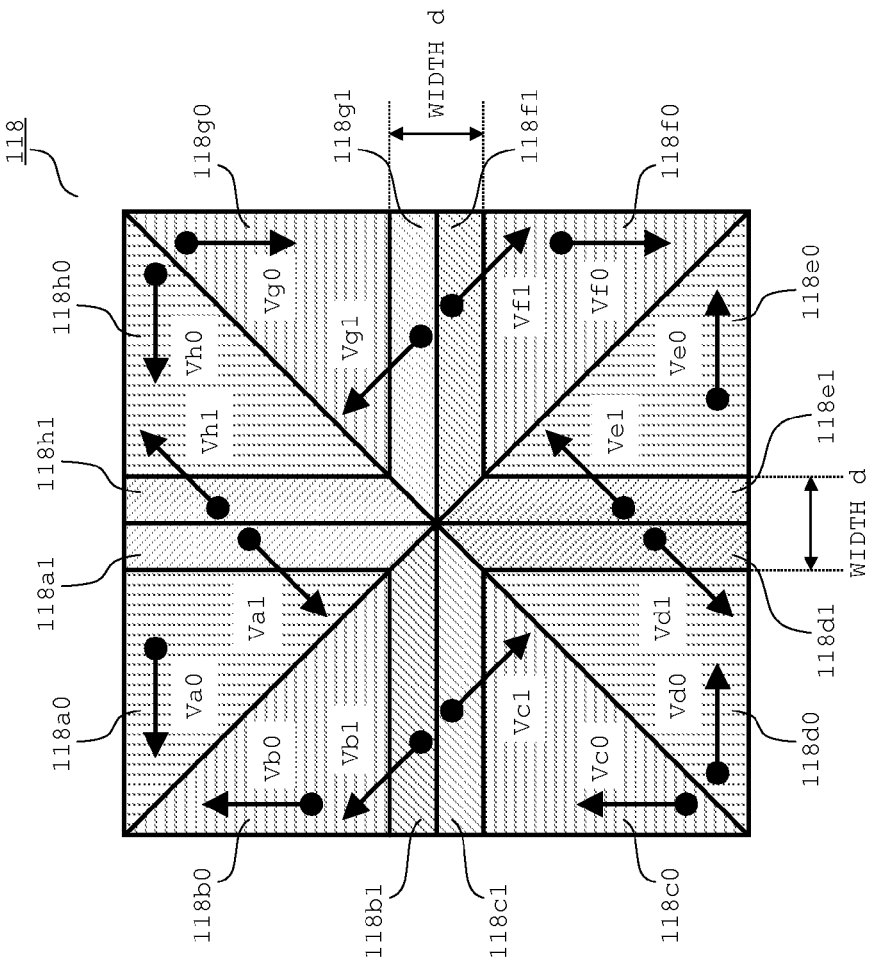
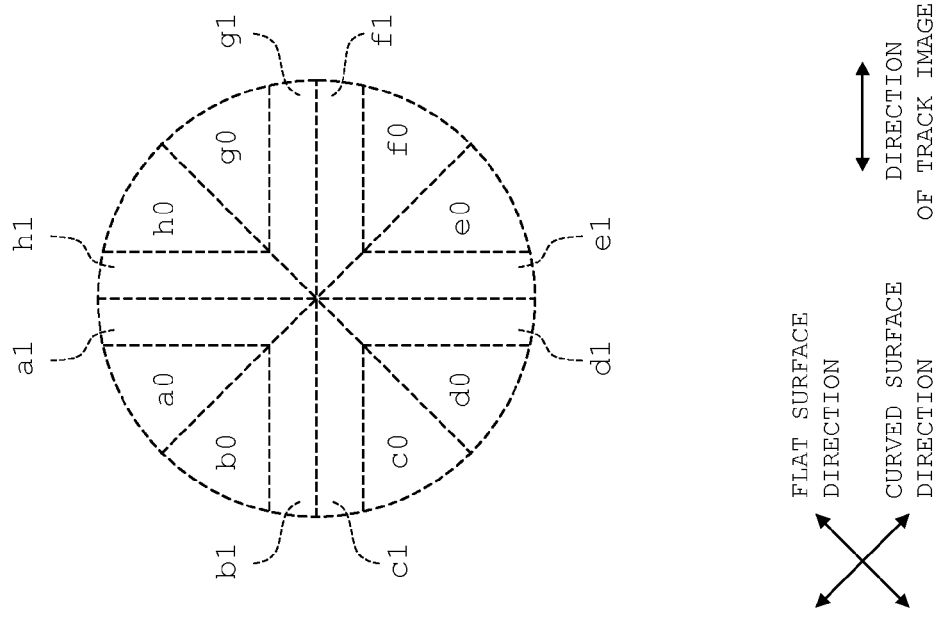

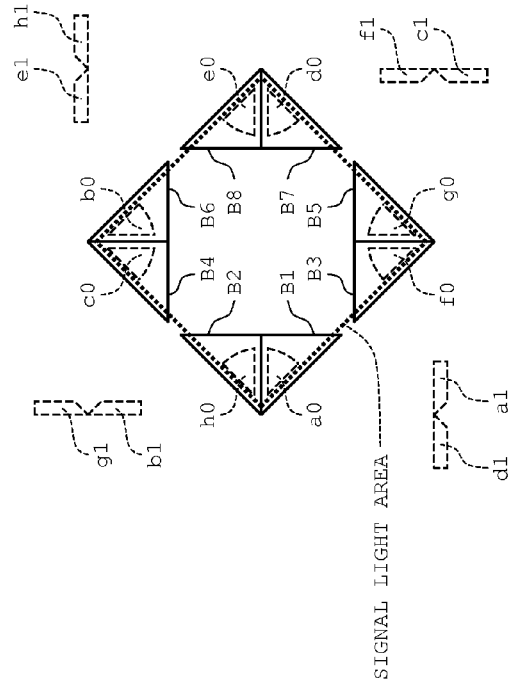
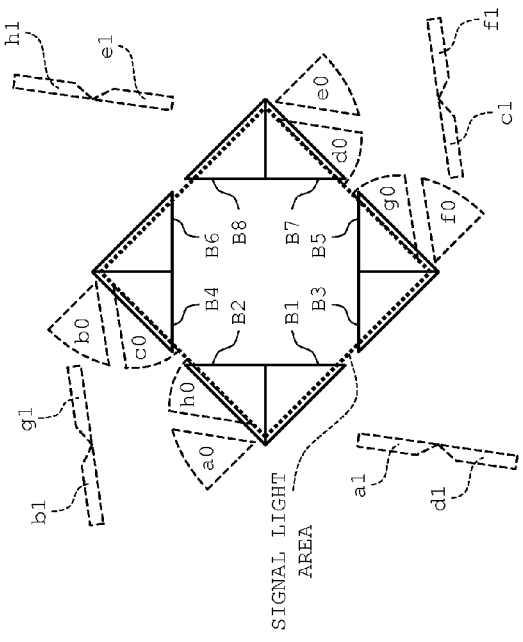
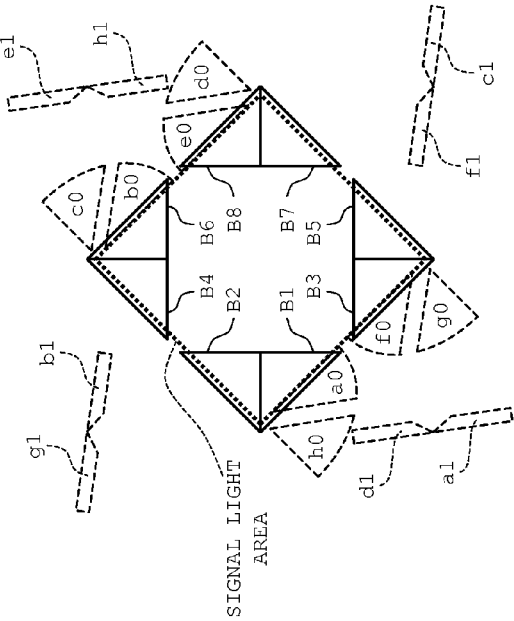

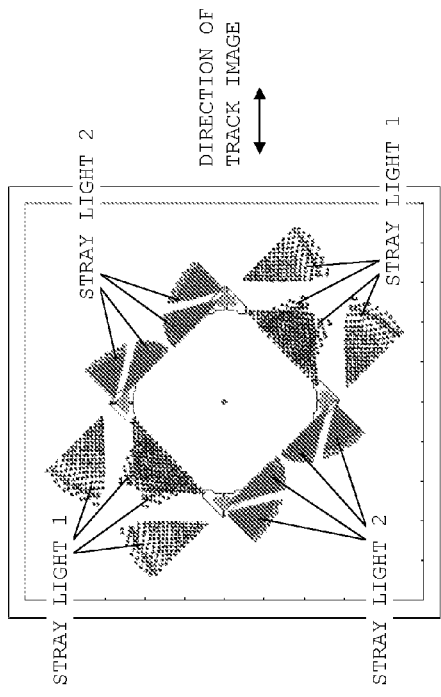
FIG.15C SPECTRAL ELEMENT 118 (WITHOUT LENS SHIFT)
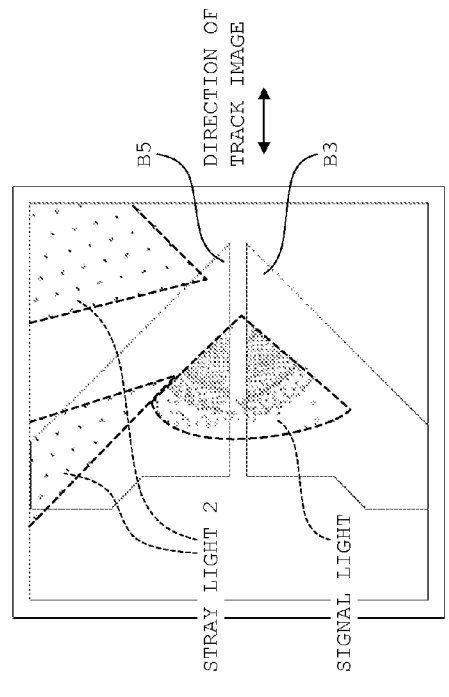
FIG.15D SPECTRAL ELEMENT 118 (WITHOUT LENS SHIFT)
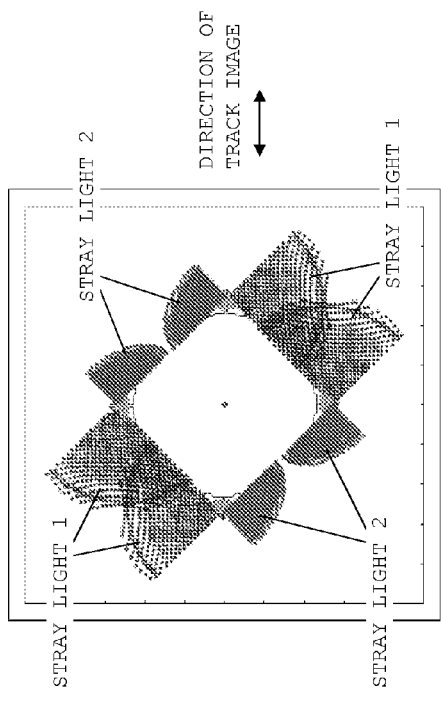
FIG.15A SPECTRAL ELEMENT H (WITHOUT LENS SHIFT)
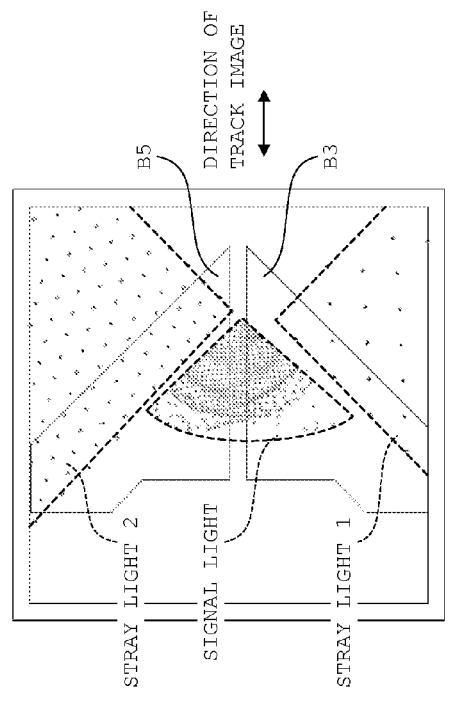
FIG.15B SPECTRAL ELEMENT H (WITHOUT LENS SHIFT)

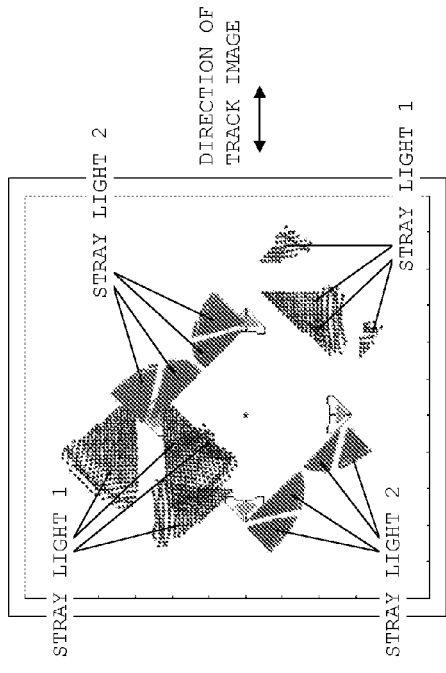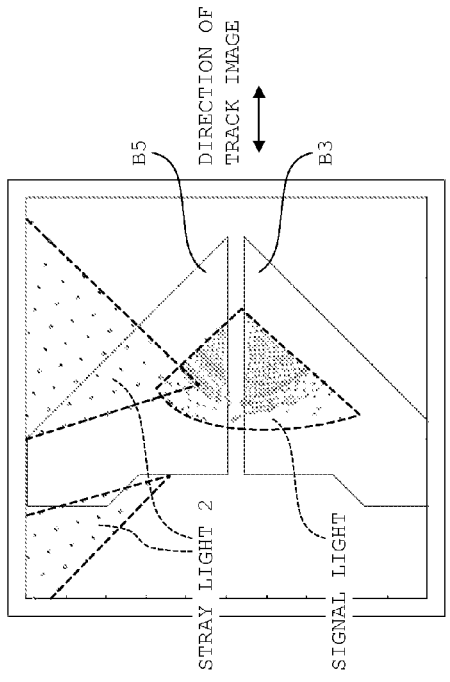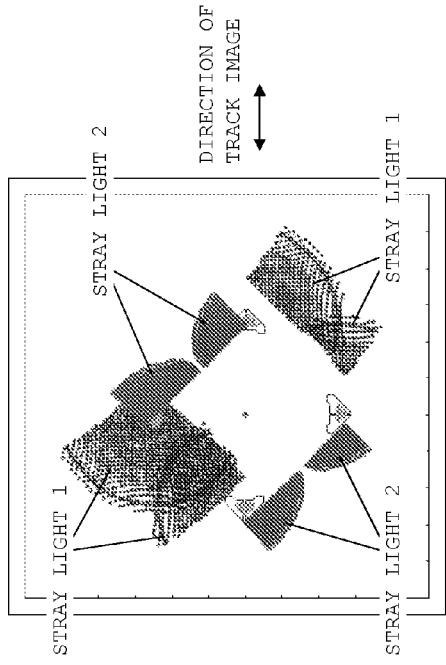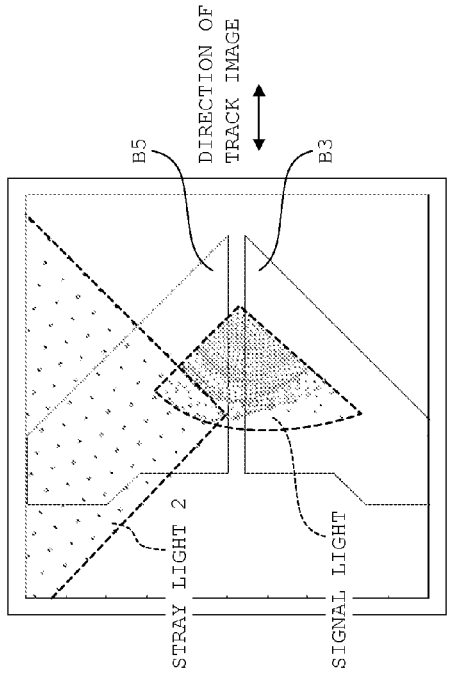

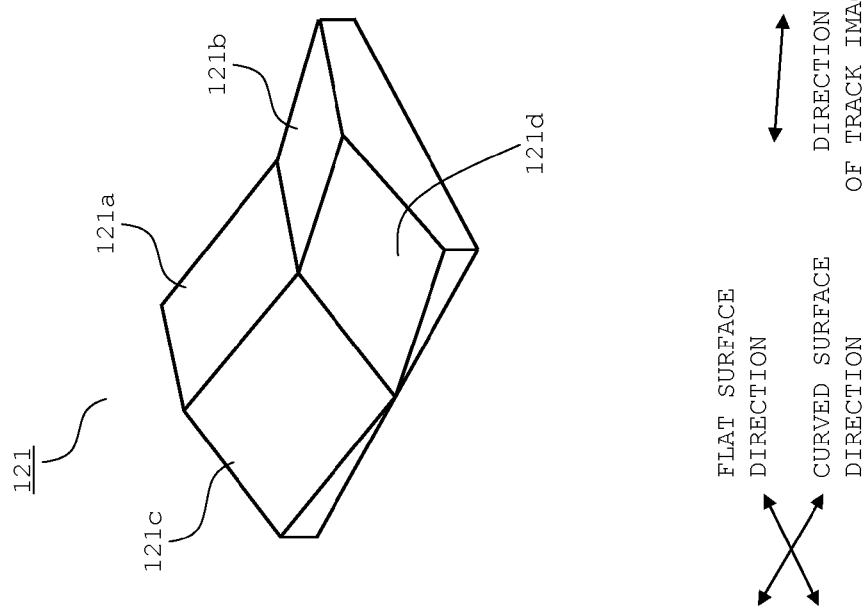

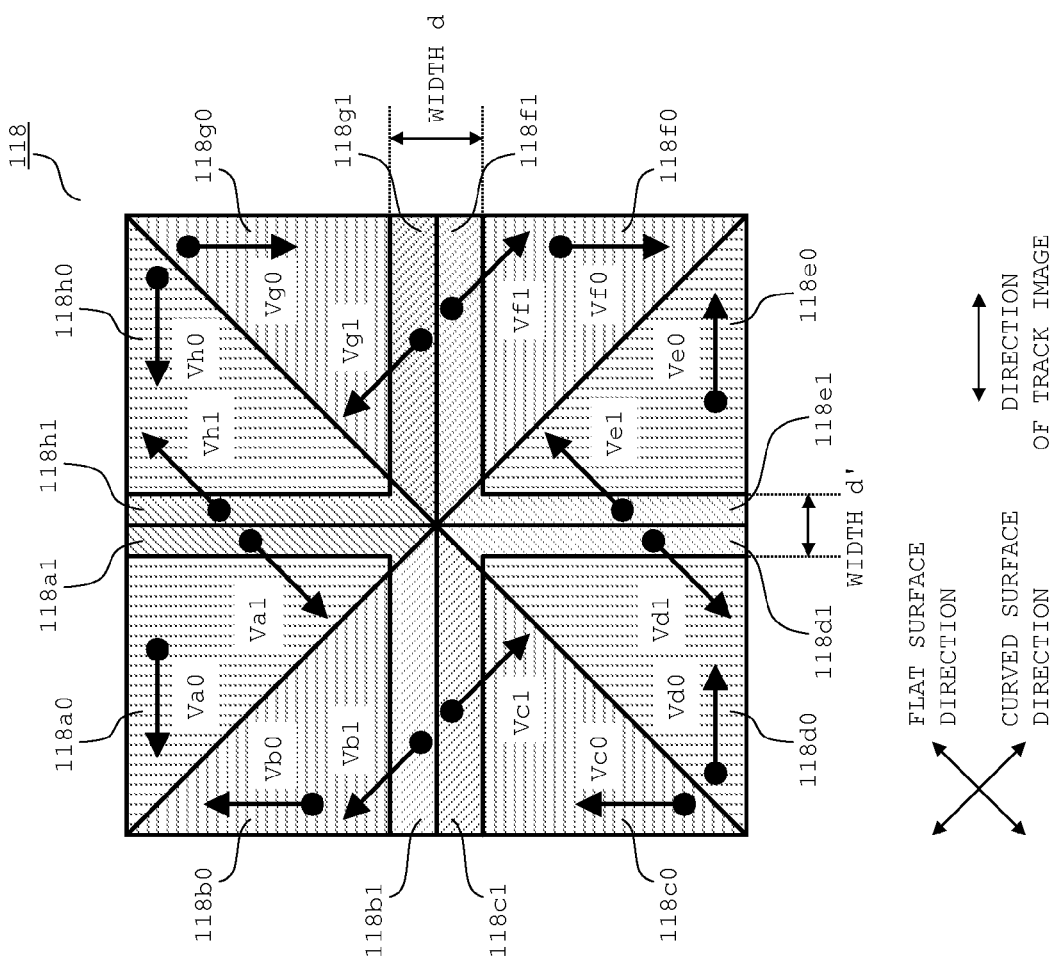
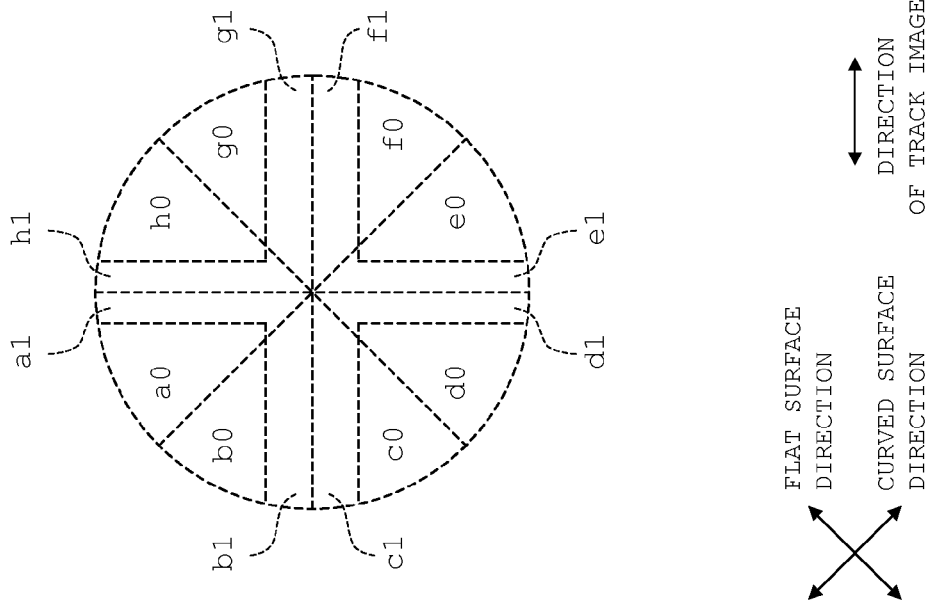
FIG. 18A
FIG. 18B

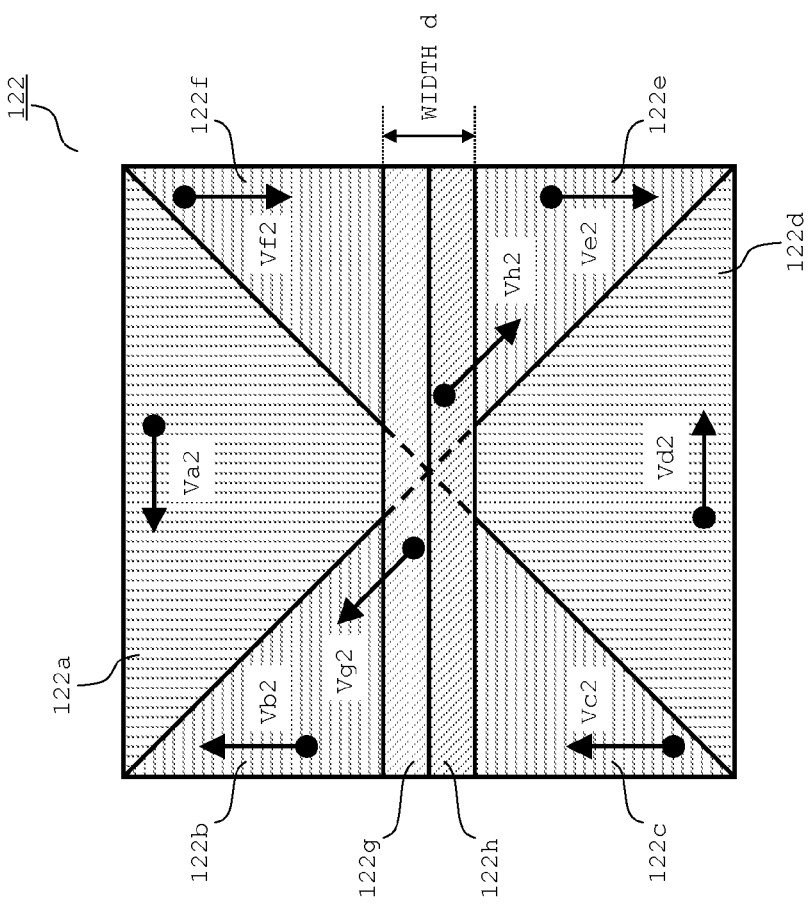
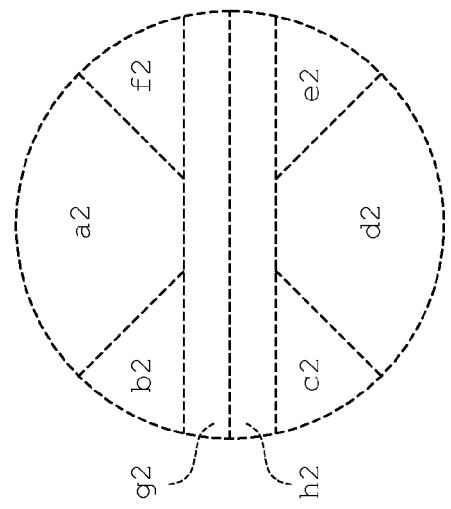
FIG. 19A
FIG. 19B

OPTICAL PICKUP DEVICE

This application claims priority under 35 U.S.C. Section 119 of Japanese Patent Application No. 2010-172210 filed Jul. 30, 2010, entitled "OPTICAL PICKUP DEVICE". The disclosure of the above application is incorporated herein by reference.

BACKGROUND OF THE INVENTION

1. Technical Field of the Invention

The invention relates to an optical pickup device, and more particularly to an optical pickup device suitable for use in irradiating a recording medium having plural laminated recording layers with laser light.

2. Disclosure of Related Art

In recent years, as the capacity of an optical disc has been increased, an optical disc having an increased number of recording layers has been developed. Laminating recording layers in a disc enables to considerably increase the data capacity of the disc. In the case where recording layers are laminated, generally, two recording layers are laminated on one side of a disc. Recently, however, laminating three or more recording layers on one side of a disc has been put into practice to further increase the capacity of the disc. Thus, the capacity of a disc can be increased by increasing the number of recording layers to be laminated. However, as the number of recording layers to be laminated is increased, the distance between the recording layers is decreased, and signal deterioration resulting from an interlayer crosstalk is increased.

As the number of recording layers to be laminated is increased, reflection light from a recording layer (a targeted recording layer) to be recorded/reproduced is reduced. As a result, if unwanted reflection light (stray light) is entered into a photodetector from a recording layer on or under the targeted recording layer, a detection signal may be deteriorated, which may adversely affect focus servo control and tracking servo control. In view of this, in the case where a large number of recording layers are laminated, it is necessary to properly remove stray light, and stabilize a signal from a photodetector.

Japanese Unexamined Patent Publication No. 2009-211770 (corresponding to U.S. Patent Application Publication No. US2009/0225645 A1) discloses a novel arrangement of an optical pickup device operable to properly remove stray light, in the case where a large number of recording layers are formed. With this arrangement, it is possible to form an area where only signal light exists, on a light receiving surface of a photodetector. By disposing a sensor of the photodetector in the above area, it is possible to suppress an influence on a detection signal resulting from stray light.

In the above optical pickup device, an area onto which signal light is irradiated, and an area onto which stray light is irradiated are adjacent to each other. As a result, even if a sensor is disposed in an area where only signal light exists, apart of stray light may be entered into the sensor, which may degrade the precision of a detection signal. Further, if the position of the sensor disposed on the photodetector is displaced in the above optical pickup device, a detection signal may be degraded depending on positional displacement amount.

SUMMARY OF THE INVENTION

A main aspect of the invention relates to an optical pickup device. The optical pickup device according to the main aspect includes a light source which emits laser light; an objective lens which focuses the laser light on a recording layer; an astigmatism element which imparts astigmatism to reflected light of the laser light reflected on the recording layer; a spectral element into which the reflected light is entered, and which separates the reflected light; and a photodetector which receives the reflected light. In the above arrangement, the astigmatism element converges the reflected light in a first direction and in a second direction perpendicular to the first direction so that the reflected light forms focal lines at different positions from each other. The spectral element is divided into six second areas by a straight line in parallel to the first direction, a straight line in parallel to the second direction, and a first area having a predetermined width and formed along a straight line in parallel to a third direction inclined from the first direction by 45 degrees. The spectral element is configured to guide the reflected light passing through the six second areas to corresponding sensors on the photodetector while making propagating directions of the reflected light different from each other, and to avoid guiding the reflected light entered into the first area to the sensors.

BRIEF DESCRIPTION OF THE DRAWINGS

These and other objects, and novel features of the present invention will become more apparent upon reading the following detailed description of the embodiment along with the accompanying drawings.

FIGS. 1A and 1B are diagrams for describing a technical principle (as to how light rays converge) in an embodiment of the invention.

FIGS. 2A through 2D are diagrams for describing the technical principle (as to how light fluxes are distributed) in the embodiment.

FIGS. 3A through 3D are diagrams for describing the technical principle (as to how signal light and stray light are distributed) in the embodiment.

FIGS. 5A through 5D are diagrams for describing a method for arranging sensors in the embodiment.

FIGS. 7A through 7D are schematic diagrams showing an arrangement of a spectral element based on the technical principle of the embodiment, and an irradiation area in the case where the spectral element is used.

FIGS. 10A through 10C are diagrams showing an optical system of an optical pickup device in an inventive example.

FIGS. 11A and 11B are diagrams showing an arrangement of a spectral element in the inventive example.

FIGS. 13A through 13C are schematic diagrams showing irradiation areas in the inventive example.

FIGS. 15A through 15D are diagrams showing a simulation result, in the case where the spectral element based on the technical principle of the embodiment is used, and in the case where the spectral element in the inventive example is used.

FIGS. 16A through 16D are diagrams showing a simulation result, in the case where the spectral element based on the technical principle of the embodiment is used, and in the case where the spectral element in the inventive example is used.

FIGS. 17A and 17B are diagrams showing a modification example of the arrangement of the spectral element in the inventive example.

FIGS. 18A and 18B are diagrams showing a modification example of the arrangement of the spectral element in the inventive example.

FIGS. 19A and 19B are diagrams showing a modification example of the arrangement of the spectral element in the inventive example.

Figures 4A, 4B:
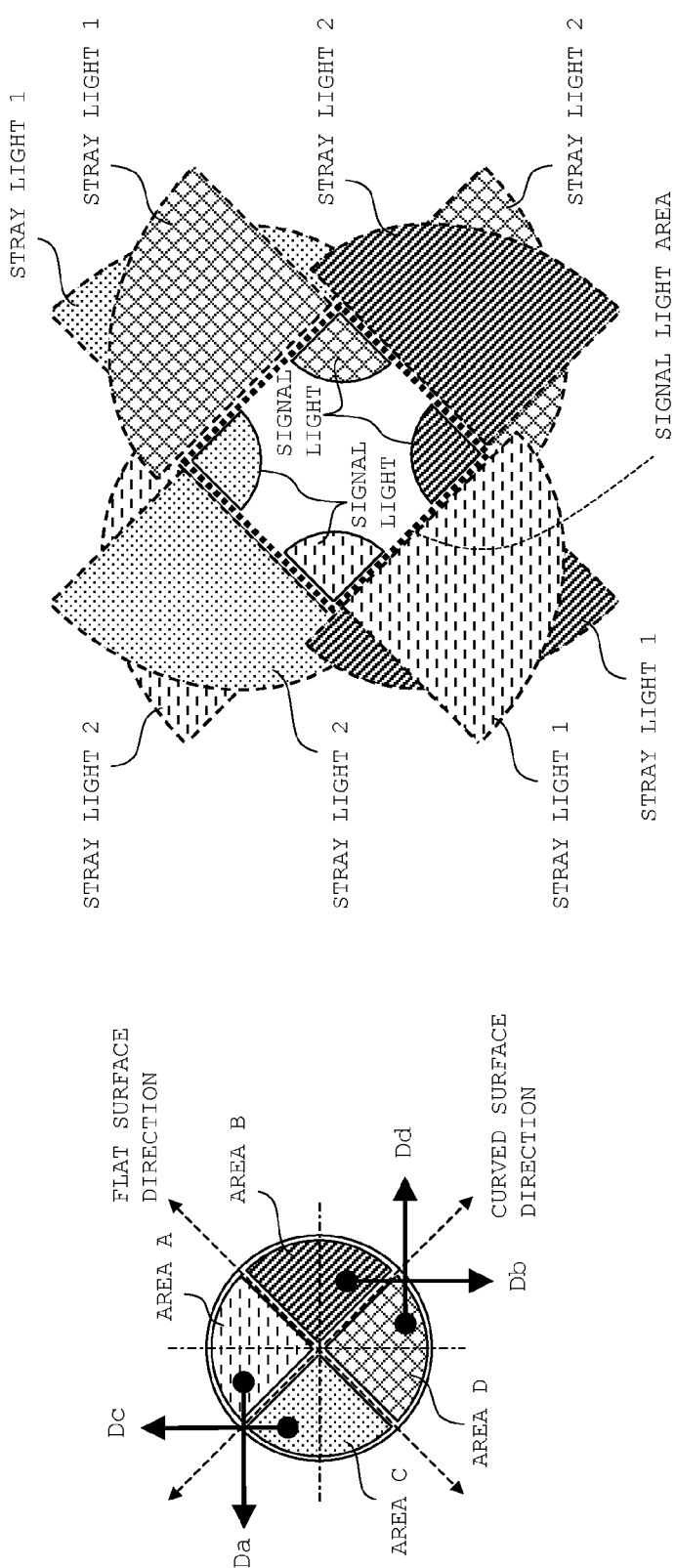
FIGS. 4A and 4B are diagrams for describing the technical principle (a method for separating light fluxes) in the embodiment.

The drawings are provided mainly for describing the present invention, and do not limit the scope of the present invention.

DESCRIPTION OF PREFERRED EMBODIMENTS

In the following, an embodiment of the invention is described referring to the drawings.

Technical Principle

First, a technical principle to which the embodiment of the invention is applied is described referring to FIGS. 1A through 6.

FIG. 1A is a diagram showing a state as to how light rays are converged. FIG. 1A is a diagram showing a state as to how laser light (signal light) reflected on a target recording layer, laser light (stray light 1) reflected on a layer located at a rearward position with respect to the target recording layer, and laser light (stray light 2) reflected on a layer located at a forward position with respect to the target recording layer are converged. FIG. 1B is a diagram showing an arrangement of an anamorphic lens to be used in the technical principle.

Referring to FIG. 1B, the anamorphic lens has a function of converging laser light to be entered in a direction in parallel to the lens optical axis, in a curved surface direction and a flat surface direction. The curved surface direction and the flat surface direction intersect perpendicularly to each other. Further, the curved surface direction has a smaller radius of curvature than that of the flat surface direction, and has a greater effect of converging laser light to be entered into the anamorphic lens.

To simplify the description on the astigmatism function of the anamorphic lens, the terms "curved surface direction" and "flat surface direction" are used. Actually, however, as far as the anamorphic lens has a function of forming focal lines at different positions from each other, the shape of the anamorphic lens in the "flat surface direction" in FIG. 1B is not limited to a flat plane shape. In the case where laser light is entered into the anamorphic lens in a convergence state, the shape of the anamorphic lens in the "flat surface direction" may be a straight line shape (where the radius of curvature=∞).

Referring to FIG. 1A, signal light converged by the anamorphic lens forms focal lines at different positions from each other by convergence in the curved surface direction and in the flat surface direction. The focal line position (S1) of signal light by convergence in the curved surface direction is close to the anamorphic lens than the focal line position (S2) of signal light by convergence in the flat surface direction, and the convergence position (S0) of signal light is an intermediate position between the focal line positions (S1) and (S2) by convergence in the curved surface direction and in the flat surface direction.

Similarly to the above, the focal line position (M11) of stray light 1 converged by the anamorphic lens by convergence in the curved surface direction is close to the anamorphic lens than the focal line position (M12) of stray light 1 by convergence in the flat surface direction. The anamorphic lens is designed to make the focal line position (M12) of stray light 1 by convergence in the flat surface direction close to the anamorphic lens than the focal line position (S1) of signal light by convergence in the curved surface direction.

Similarly to the above, the focal line position (M21) of stray light 2 converged by the anamorphic lens in the curved surface direction is close to the anamorphic lens than the focal line position (M22) of stray light 2 by convergence in the flat surface direction. The anamorphic lens is designed to make the focal line position (M21) of stray light 2 by convergence in the curved surface direction away from the anamorphic lens than the focal line position (S2) of signal light by convergence in the flat surface direction.

Further, the beam spot of signal light has a shape of a least circle of confusion on the convergence position (S0) between the focal line position (S1) and the focal line position (S2).

Taking into account the above matters, the following is a description about a relationship between irradiation areas of signal light and stray light 1, 2 on the plane S0.

As shown in FIG. 2A, the anamorphic lens is divided into four areas A through D. In this case, signal light entered into the areas A through D is distributed on the plane S0, as shown in FIG. 2B. Further, stray light 1 entered into the areas A through D is distributed on the plane S0, as shown in FIG. 2C, and stray light 2 entered into the areas A through D is distributed on the plane S0, as shown in FIG. 2D.

If signal light and stray light 1, 2 on the plane S0 are extracted in each of light flux areas, the distributions of the respective light are as shown in FIGS. 3A through 3D. In this case, stray light 1 and stray light 2 in the same light flux area are not overlapped with signal light in each of the light flux areas. Accordingly, if the device is configured such that only signal light is received by a sensor after light fluxes (signal light, stray light 1, 2) in each of the light flux areas are separated in different directions, only signal light is entered into a corresponding sensor to thereby suppress incidence of stray light. Thus, it is possible to avoid degradation of a detection signal resulting from stray light.

As described above, it is possible to extract only signal light by dispersing and separating light passing through the areas A through D from each other on the plane S0. The embodiment is made based on the above technical principle.

FIGS. 4A and 4B are diagrams showing a distribution state of signal light and stray light 1, 2 on the plane S0, in the case where the propagating directions of light fluxes (signal light, stray light 1, 2) passing through the four areas A through D shown in FIG. 2A are respectively changed in different directions by the same angle. FIG. 4A is a diagram of the anamorphic lens when viewed from the optical axis direction of the anamorphic lens (the propagating direction along which laser light is entered into the anamorphic lens), and FIG. 4B is a diagram showing a distribution state of signal light, stray light 1, 2 on the plane S0.

In FIG. 4A, the propagating directions of light fluxes (signal light, stray light 1, 2) that have passed through the areas A through D are respectively changed into directions Da, Db, Dc, Dd by the same angle amount α (not shown) with respect to the propagating directions of the respective light fluxes before incidence. The directions Da, Db, Dc, Dd each has an inclination of 45° with respect to the flat surface direction and the curved surface direction.

In this case, as shown in FIG. 4B, it is possible to distribute signal light and stray light 1, 2 in each of the light flux areas, on the plane S0, by adjusting the angle amount a with respect to the directions Da, Db, Dc, Dd. As a result of the above operation, as shown in FIG. 4B, it is possible to form a signal light area where only signal light exists on the plane S0. By disposing sensors of a photodetector in the signal light area, it is possible to receive only signal light in each of the light flux areas by a corresponding sensor.

FIGS. 5A through 5D are diagrams showing a method for arranging sensors. FIG. 5A is a diagram showing light flux areas of reflected light (signal light) on a disc, and FIG. 5B is a diagram showing a distribution state of signal light on a photodetector, in the case where an anamorphic lens and a photodetector (a four-divided sensor) based on a conventional astigmatism method are respectively disposed on the arranged position of the anamorphic lens and on the plane S0, in the arrangement shown in FIG. 1A. FIGS. 5C and 5D are diagrams showing a distribution state of signal light and a sensor layout based on the above principle, on the plane S0.

The direction of a diffraction image (a track image) of signal light resulting from a track groove has an inclination of 45° with respect to the flat surface direction and the curved surface direction. In FIG. 5A, assuming that the direction of a track image is aligned with leftward and rightward directions, in FIGS. 5B through 5D, the direction of a track image by signal light is aligned in upward and downward directions. In FIGS. 5A and 5B, to simplify the description, a light flux is divided into eight light flux areas a through h. Further, the track image is shown by the solid line, and the beam shape in an out-of-focus state is shown by the dotted line.

It is known that an overlapped state of a zero-th order diffraction image and a first-order diffraction image of signal light resulting from a track groove is obtained by an equation: wavelength/(track pitch×objective lens NA). As shown in FIGS. 5A, 5B, 5D, a requirement that a first-order diffraction image is formed in the four light flux areas a, b, e, h is expressed by: wavelength track pitch×objective lens NA>√2.

In the conventional astigmatism method, sensors P1 through P4 (a four-divided sensor) of a photodetector are arranged as shown in FIG. 5B. In this case, assuming that detection signal components based on light intensities in the light flux areas a through h are expressed by A through H, a focus error signal FE and a push-pull signal PP are obtained by the following equations (1) and (2).

$$FE=(A+B+E+F)-(C+D+G+H) \quad (1)$$

$$PP=(A+B+G+H)-(C+D+E+F) \quad (2)$$

On the other hand, as described above, signal light is distributed in the signal light area as shown in FIG. 5C in the distribution state shown in FIG. 4B. In this case, signal light passing through the light flux areas a through h shown in FIG. 5A is distributed as shown in FIG. 5D. Specifically, signal light passing through the light flux areas a through h in FIG. 5A are guided to the light flux areas a through h shown in FIG. 5D, on the plane S0 where the sensors of the photodetector are disposed.

Accordingly, by disposing the sensors P11 through P18 at the positions of the light flux areas a through h shown in FIG. 5D in an overlapped state as shown in FIG. 5D, it is possible to generate a focus error signal and a push-pull signal by performing the same computation as applied to the process described in the case of FIG. 5B. Specifically, assuming that A through H represent detection signals from the sensors for receiving light fluxes in the light flux areas a through h, a focus error signal FE and a push-pull signal PP can be acquired by the above equations (1) and (2) in the same manner as described in the case of FIG. 5B.

As described above, according to the above principle, it is possible to generate a focus error signal and a push-pull signal (a tracking error signal) with no or less influence of stray light by performing the same computation as applied to the process based on the conventional astigmatism method.

Figure 6:
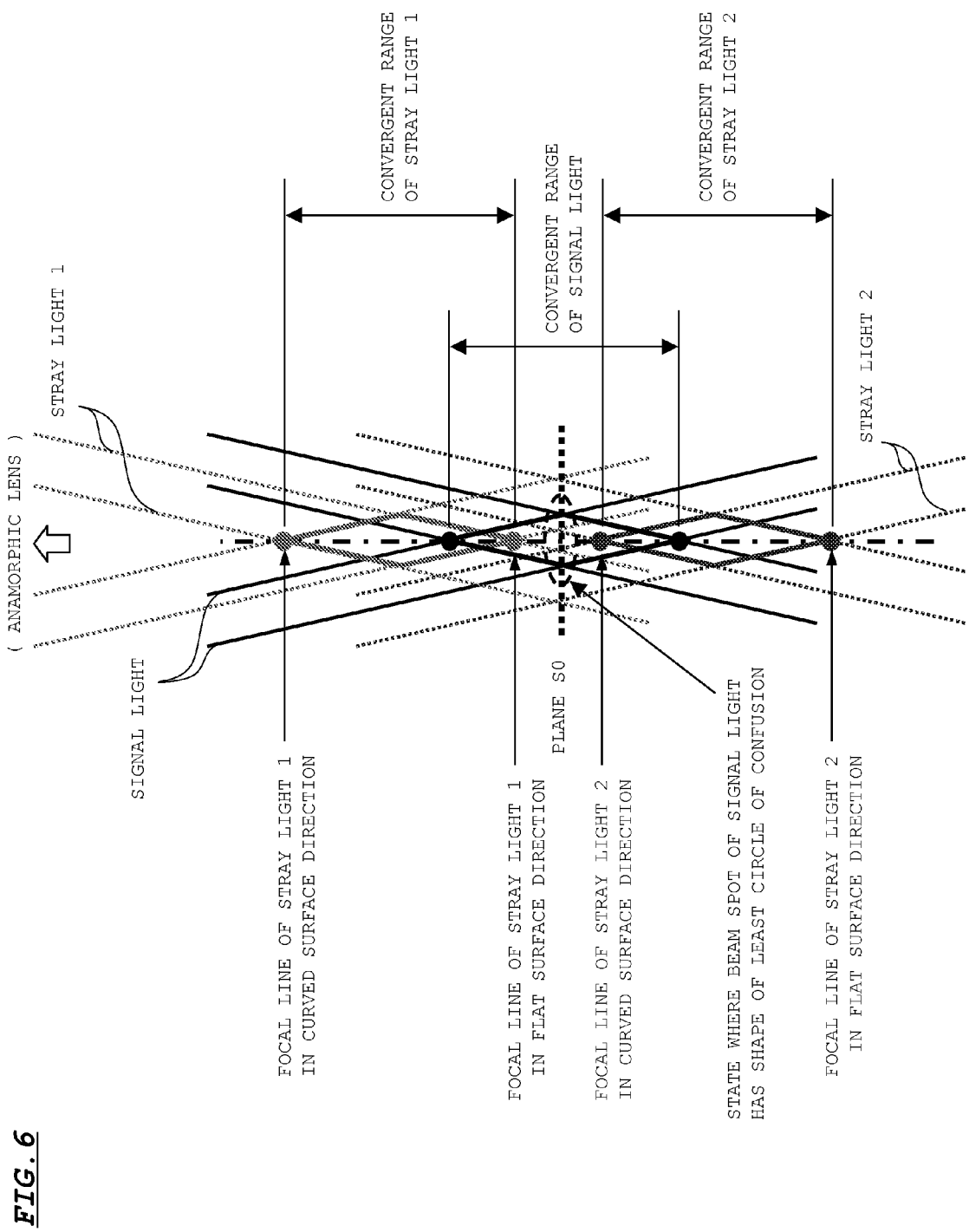
FIG. 6 is a diagram showing a preferable range to which the technical principle of the embodiment is applied.

The effect by the above principle is obtained, as shown in FIG. 6, in the case where the focal line position of stray light 1 in the flat surface direction is close to the anamorphic lens with respect to the plane S0 (a plane where the beam spot of signal light has a shape of a least circle of confusion), and the focal line position of stray light 2 in the curved surface direction is away from the anamorphic lens with respect to the plane S0. Specifically, as far as the above relationship is satisfied, the distribution state of signal light, and stray light 1, 2 is as shown in FIG. 4B, which makes it possible to keep signal light, and stray light 1, 2 from overlapping each other on the plane S0. In other words, as far as the above relationship is satisfied, the advantage based on the above principle is obtained, even if the focal line position of stray light 1 in the flat surface direction comes closer to the plane S0 than the focal line position of signal light in the curved surface direction, or even if the focal line position of stray light 2 in the curved surface direction comes closer to the plane S0 than the focal line position of signal light in the flat surface direction.

A spectral element H can be used to distribute signal light passing through the eight light flux areas a through h shown in FIG. 5A, on the sensor layout shown in FIG. 5D.

FIG. 7A is a diagram showing an arrangement of the spectral element H. FIG. 7A is a plan view of the spectral element H when viewed from the side of the anamorphic lens shown in FIG. 1B. FIG. 7A also shows the flat surface direction, the curved surface direction of the anamorphic lens shown in FIG. 1B, and a direction of a track image of laser light to be entered into the spectral element H.

The spectral element H is made of a square transparent plate, and has a stepped diffraction pattern (a diffraction hologram) on a light incident surface thereof. As shown in FIG. 7A, the light incident surface of the spectral element H is divided into four diffraction areas Ha through Hd. The spectral element H is disposed at such a position that laser light passing through the light flux areas A through D shown in FIG. 4A are respectively entered into the diffraction areas Ha through Hd. The diffraction areas Ha through Hd respectively diffract the entered laser light in the directions Da through Dd shown in FIG. 4A by the same angle by diffraction on the diffraction areas Ha through Hd.

FIGS. 7B through 7D are schematic diagrams showing irradiation areas, in the case where laser light passing through the eight light flux areas a through h shown in FIG. 5A is irradiated onto the sensor layout shown in FIG. 5D. FIG. 7B is a diagram showing a state as to how signal light is irradiated onto the sensors P11 through P18, in the case where the focus position of laser light is adjusted on a target recording layer. FIGS. 7C, 7D are diagrams showing states of stray light 1 and stray light 2 in the above condition. To simplify the description, the irradiation areas of laser light passing through the light flux areas a through h are indicated as irradiation areas a through h in each of the drawings of FIGS. 7B through 7D.

As shown in FIG. 7B, signal light is irradiated onto the sensors P11 through P18 based on the above principle. The sensors P11 through P18 are configured such that the irradiation area of signal light is sufficiently included in each of the sensors P11 through P18. Specifically, as shown in FIG. 7B, the sensor layout is configured in such a manner that four vertices of the signal light area are positioned on the inside of four vertices on the outside of the sensor layout.

As shown in FIG. 7C, stray light 1 is irradiated onto a position adjacent to the outside of the signal light area according to the above principle. As described above, however, if the sensor layout is configured in such a manner that the signal light area is positioned on the inside of the sensor layout, the irradiation area of stray light 1 is likely to overlap the sensors P11 through P18. Similarly to the above, as shown in FIG. 7D, the irradiation area of stray light 2 is also likely to overlap the sensors P11 through P18.

As described above, in the case where signal light passing through the light flux areas a through h is distributed on the sensor layout using the spectral element H, stray light 1, 2 is likely to be entered into the sensors P11 through P18, which may degrade the precision of output signals from the sensors P11 through P18.

Next, described is an output signal from each sensor resulting from positional displacement of the sensors P11 through P18, in the case where the spectral element H is used.

Figure 8B:
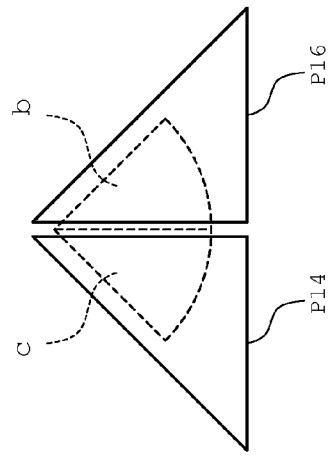
FIGS. 8A through 8F are diagrams for describing an output signal from each sensor resulting from positional displacement of a sensor, in the case where the spectral element based on the technical principle of the embodiment is used.
Figure 8C:
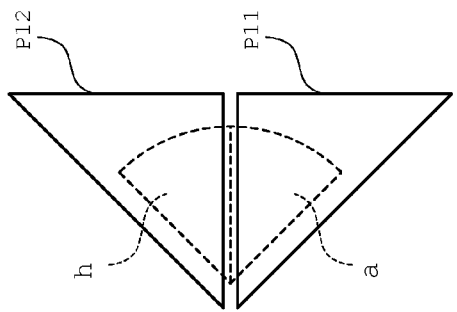
Figure 8A:
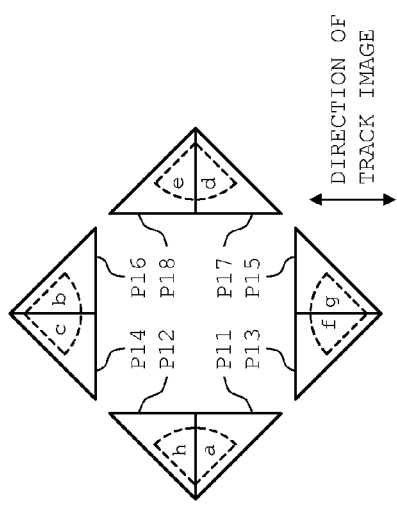

FIG. 8A is a diagram showing an irradiation area of signal light passing through the light flux areas a through h, in the case where the positions of the sensors P11 through P18 are not displaced. FIG. 8A shows a state that the focus position of laser light is adjusted on a target recording layer. As shown in FIG. 8A, in this case, signal light passing through the light flux areas a through h is uniformly irradiated onto each of the sensors.

FIGS. 8B, 8C are enlarged views showing an irradiation area near the sensors P11, P12, and an irradiation area near the sensors P14, P16 in the state shown in FIG. 8A. As shown in FIGS. 8B, 8C, a slight clearance is formed between the sensors P11, P12, and between the sensors P14, P16. Likewise, a slight clearance is formed between the sensors P13, P15, and between the sensors P17, P18.

As shown in FIG. 8B, although an upper end of the irradiation area a and a lower end of the irradiation area h are respectively deviated from the sensors P11, P12, the irradiation areas a, h respectively and uniformly overlap the sensors P11, P12. As shown in FIG. 8C, although a left end of the irradiation area b and a right end of the irradiation area c are respectively deviated from the sensors P16, P14, the irradiation areas b, c respectively and uniformly overlap the sensors P16, P14. Likewise, the irradiation areas f, g respectively and uniformly overlap the sensors P13, P15, and the irradiation areas d, e respectively and uniformly overlap the sensors P17, P18.

Figure 8E:
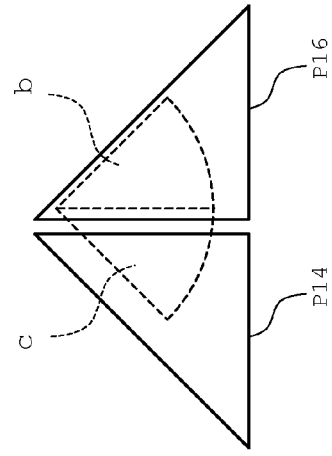
Figure 8F:
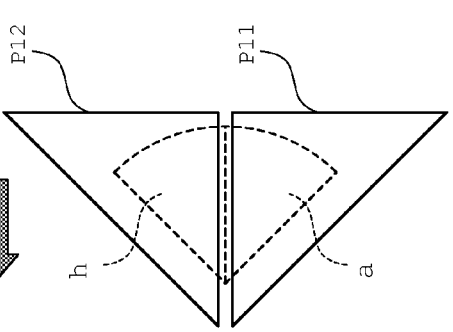
Figure 8D:
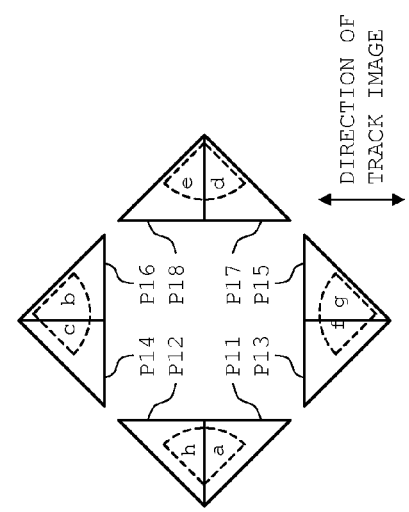

FIG. 8D is a diagram showing irradiation areas of signal light passing through the light flux areas a through h, in the case where the positions of the sensors P11 through P18 are displaced from the state shown in FIG. 8A in a direction (leftward or rightward direction) perpendicular to the direction of a track image. As shown in FIG. 8D, although the irradiation areas are the same as those in the state shown in FIG. 8A, since the positions of the sensors P11 through P18 are displaced leftward, the irradiation areas in the state shown in FIG. 8D are displaced rightward within the sensors P11 through P18.

FIG. 8E is an enlarged view showing irradiation areas near the sensors P11, P12 in the state shown in FIG. 8D. As shown in FIG. 8E, the irradiation areas a, h respectively and uniformly overlap the sensors P11, P12 in the same manner as the state shown in FIG. 8B, although the irradiation areas a, h are respectively displaced rightward from the sensors P11, P12. Accordingly, the output signals from the sensors P11, P12 in the state shown in FIG. 8E are substantially the same as the output signals from the sensors P11, P12 in the state shown in FIG. 8A. Likewise, the output signals from the sensors P17, P18 in the state shown in FIG. 8E are substantially the same as the output signals from the sensors P17, P18 in the state shown in FIG. 8A.

FIG. 8F is an enlarged view showing irradiation areas near the sensors P14, P16 in the state shown in FIG. 8D. As shown in FIG. 8F, although a right end of the irradiation area b lies within the sensor P16, a left end of the irradiation area b overlaps the sensor P16, unlike the state shown in FIG. 8C. Further, although a left end of the irradiation area c lies within the sensor P14, a right end of the irradiation area c is deviated rightward from the sensor P14 and overlaps the sensor P16, unlike the state shown in FIG. 8C. As a result, the output signal from the sensor P16 is increased, and the output signal from the sensor P14 is decreased, as compared with the state shown in FIG. 8A. Likewise, the output signal from the sensor P15 is increased, and the output signal from the sensor P13 is decreased, as compared with the state shown in FIG. 8A.

Further, in the case where the positions of the sensors P11 through P18 are displaced rightward substantially by the same displacement amount as the state shown in FIG. 8D, the output signals from the sensors P11, P12, P17, P18 are kept substantially unchanged, the output signals from the sensors P13, P14 are increased, and the output signals from the sensors P15, P16 are decreased, as compared with the state shown in FIG. 8A. Further, in the case where the positions of the sensors P11 through P18 are displaced in a direction (upward or downward direction) in parallel to the direction of a track image substantially by the same displacement amount as the state shown in FIG. 8D, the output signals from the sensors P13 through P16 are kept substantially unchanged, and the output signals from the sensors P11, P12, P17, P18 are changed.

In the above arrangement, it is preferable to keep the output signals from the sensors P11 through P18 unchanged, even if the positions of the sensors P11 through P18 are displaced. However, as described above, if the positions of the sensors P11 through P18 are displaced, the output signals from the sensors P11 through P18 are changed depending on a direction of the positional displacement and an amount of the positional displacement. As a result, the precision of output signals from the sensors P11 through P18 may be lowered.

Next, there is described an approach of suppressing an offset (DC component) of a push-pull signal resulting from positional displacement of the sensors P11 through P18, in the case where the spectral element H is used. An example of the approach is disclosed in Japanese Patent Application No. 2009-10369 (corresponding to U.S. Patent Application Publication No. US2010/0182891 A1) previously filed by the applicant of the present application. The disclosures of the above applications are incorporated herein by reference.

Figure 9:
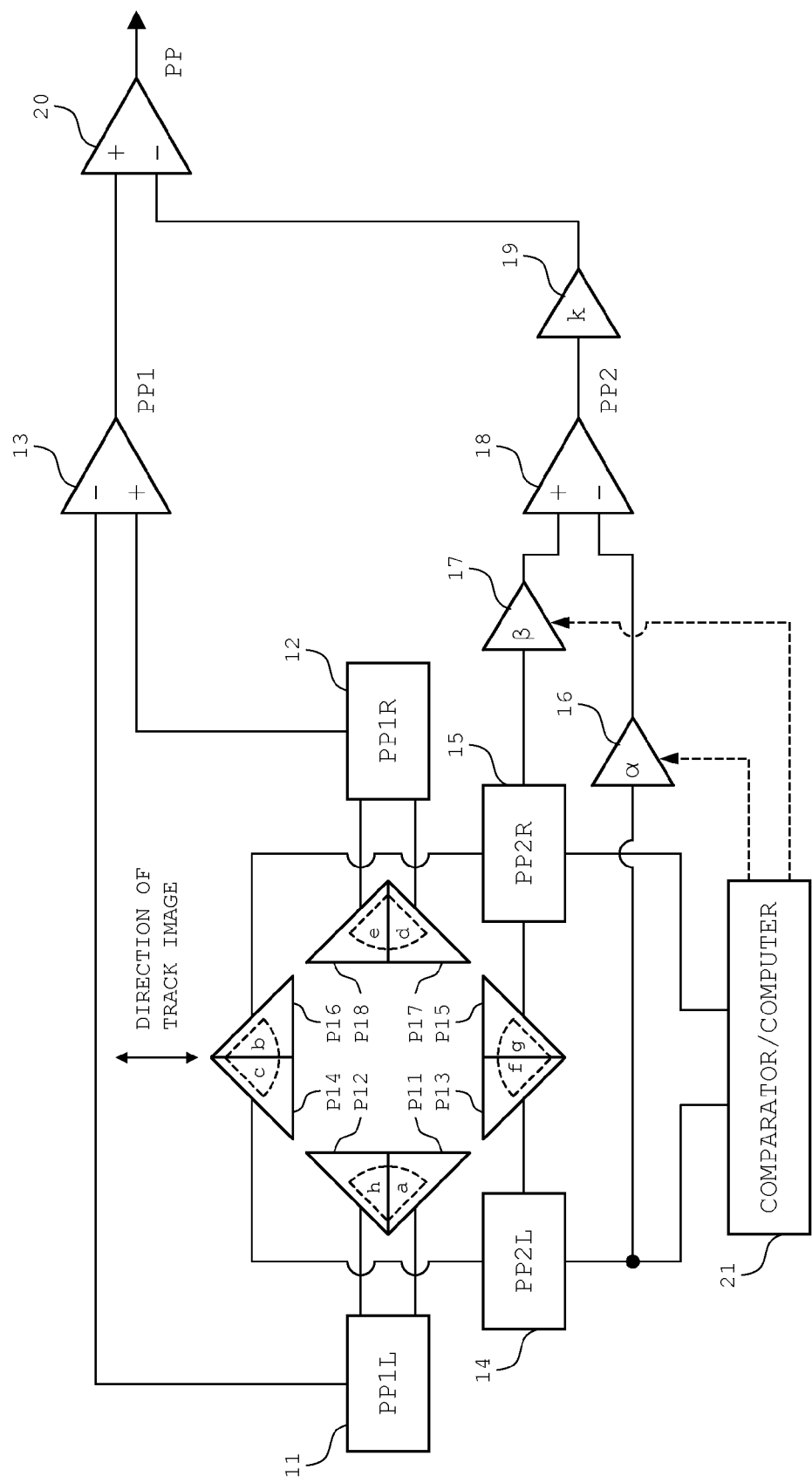
FIG. 9 is a diagram for describing an approach of suppressing an offset (DC component) of a push-pull signal resulting from positional displacement of a sensor, in the case where the spectral element based on the technical principle of the embodiment is used.

FIG. 9 is a diagram showing a circuit configuration for suppressing an offset (a DC component) of a push-pull signal. The push-pull signal generation circuit in the above case is provided with adder circuits 11, 12, 14, 15, subtractor circuits 13, 18, 20, gain circuits 16, 17, a multiplier circuit 19, and a comparator/computer 21.

The adder circuit 11 sums up output signals from the sensors P11, P12, and outputs a signal PP1L in accordance with the light amount of left-side signal light. The adder circuit 12 sums up output signals from the sensors P17, P18, and outputs a signal PP1R in accordance with the light amount of right-side signal light. The subtractor circuit 13 computes a difference between output signals from the adder circuits 11, 12, and generates a signal PP1 based on a light amount difference between the left and right two signal light.

The adder circuit 14 sums up output signals from the sensors P13, P14, and outputs a signal PP2L in accordance with the light amount of left-side signal light of upper and lower two signal light. The adder circuit 15 sums up output signals from the sensors P15, P16, and outputs a signal PP2R in accordance with the light amount of right-side signal light of upper and lower two signal light. The gain circuits 16, 17 multiplies the outputs from the adder circuits 14, 15 by gains α, β under the control of the comparator/computer 21. The subtractor circuit 18 computes a difference between output signals from the gain circuits 16, 17, and generates a signal PP2 based on alight amount difference in leftward or rightward direction between the upper and lower two signal light.

The multiplier circuit 19 outputs a signal obtained by multiplying the signal PP2 to be outputted from the subtractor circuit 18 with a variable k to the subtractor circuit 20. In this arrangement, the variable k is set to a value that suppresses an offset (a DC component) of a push-pull signal resulting from lens shift. A concrete setting method of the variable k is disclosed in Japanese Unexamined Patent Publication No. 2010-102813 (corresponding to U.S. Patent Application Publication No. US2010/0080106 A1) of the patent application previously filed by the applicant of the present application. The disclosures of the above applications are incorporated herein by reference.

The subtractor circuit 20 subtracts a signal to be inputted from the multiplier circuit 19, from the signal PP1 to be inputted from the subtractor circuit 13; and outputs a signal after the subtraction as a push-pull signal.

The comparator/computer 21 adjusts the gains α, β of the gain circuits 16 17 based on signals from the adder circuits 14, 15. The comparator/computer 21 calculates the gains α, β by the following equations (3), (4) in a state that the optical axes of the objective lens and laser light are not displaced from each other (no lens shift) immediately after laser light is focused on a disc (a state that tracking servo control is turned off).

$$\alpha = \{(PP2L+PP2R)/2\}/PP2L \quad (3)$$

$$\beta = \{(PP2L+PP2R)/2\}/PP2R \quad (4)$$

The comparator/computer 21 calculates the gains α, β by the equations (3), (4), and sets the calculated gains α, β in the gain circuits 16, 17.

As described above, by setting the gains α, β, it is possible to correct imbalance of signals from the adder circuits 14, 15, even in the case where the positions of the sensors P11 through P18 are displaced in a direction (leftward or rightward direction) perpendicular to the direction of a track image. With this arrangement, it is possible to suppress an offset (a DC component) of a push-pull signal based on a displacement amount, in the case where the positions of the sensors P11 through P18 are displaced in leftward or rightward direction.

In the above arrangement, if the positions of the sensors P11 through P18 are displaced in leftward or rightward direction, as described above referring to FIGS. 8D through 8F, output signals from the sensors P13 through P16 are changed depending on a displacement amount. Further, output signals from the adder circuits 14, 15 are changed depending on a change in the output signals from the sensors P13 through P16. In view of the above, it is necessary to properly set the gains α, β depending on a displacement amount of the sensors P11 through P18 in leftward or rightward direction. In this case, if positional displacement of the sensors P11 through P18 is increased, the gains α, β are also increased in accordance with an increase in the positional displacement. An increase in the gains α, β results in an increase of noise which may be superimposed on the signals PP2L, PP2R, which may resultantly lower the precision of a push-pull signal.

In the following description on an example, there is described an improvement on the spectral element H that enables to suppress the aforementioned drawbacks, as well as a concrete construction example of the optical pickup device.

EXAMPLE

The inventive example is an example, wherein the invention is applied to an optical pickup device compatible with BD, DVD and CD. The above principle is applied only to an optical system for BD, and a focus adjusting technology by a conventional astigmatism method and a tracking adjusting technology by a 3-beam system (an in-line system) are applied to an optical system for CD and an optical system for DVD.

FIGS. 10A and 10B are diagrams showing an optical system of an optical pickup device in the inventive example. FIG. 10A is a plan view of the optical system showing a state that elements of the optical system on the disc side with respect to rise-up mirrors 114, 115 are omitted, and FIG. 10B is a perspective side view of the optical system posterior to the rise-up mirrors 114, 115.

As shown in FIG. 10A, the optical pickup device is provided with a semiconductor laser 101, a half wave plate 102, a diverging lens 103, a dual wavelength laser 104, a diffraction grating 105, a diverging lens 106, a complex prism 107, a front monitor 108, a collimator lens 109, a driving mechanism 110, reflection mirrors 111, 112, a quarter wave plate 113, the rise-up mirrors 114, 115, a dual wavelength objective lens 116, a BD objective lens 117, a spectral element 118, an anamorphic lens 119, and a photodetector 120.

The semiconductor laser 101 emits laser light (hereinafter, called as "BD light") for BD and having a wavelength of or about 405 nm. The half wave plate 102 adjusts the polarization direction of BD light. The diverging lens 103 adjusts the focal length of BD light to shorten the distance between the semiconductor laser 101 and the complex prism 107.

The dual wavelength laser 104 accommodates, in a certain CAN, two laser elements which each emit laser light (hereinafter, called as "CD light") for CD and having a wavelength of or about 785 nm, and laser light (hereinafter, called as "DVD light") for DVD and having a wavelength of or about 660 nm.

FIG. 10C is a diagram showing an arrangement pattern of laser elements (laser light sources) in the dual wavelength laser 104. FIG. 10C is a diagram of the dual wavelength laser 104 when viewed from the beam emission side. In FIG. 10C, CE and DE respectively indicate emission points of CD light and DVD light. The gap between the emission points of CD light and DVD light is represented by the symbol G.

As will be described later, the gap G between the emission point CE of CD light and the emission point DE of DVD light is set to such a value as to properly irradiate DVD light onto a four-divided sensor for DVD light. Accommodating two light sources in one CAN as described above enables to simplify the optical system, as compared with an arrangement provided with plural CANs.

Referring back to FIG. 10A, the diffraction grating 105 separates each of CD light and DVD light into a main beam and two sub beams. The diffraction grating 105 is a two-step diffraction grating. Further, the diffraction grating 105 is integrally formed with a half wave plate. The half wave plate integrally formed with the diffraction grating 105 adjusts the polarization directions of CD light and DVD light. The diverging lens 106 adjusts the focal lengths of CD light and DVD light to shorten the distance between the dual wavelength laser 104 and the complex prism 107.

The complex prism 107 is internally formed with a dichroic surface 107a, and a Polarizing Beam Splitter (PBS) surface 107b. The dichroic surface 107a reflects BD light, and transmits CD light and DVD light. The semiconductor laser 101, the dual wavelength laser 104 and the complex prism 107 are disposed at such positions that the optical axis of BD light reflected on the dichroic surface 107a and the optical axis of CD light transmitted through the dichroic surface 107a are aligned with each other. The optical axis of DVD light transmitted through the dichroic surface 107a is displaced from the optical axes of BD light and CD light by the gap G shown in FIG. 10C.

A part of each of BD light, CD light and DVD light is reflected on the PBS surface 107b, and a main part thereof is transmitted through the PBS surface 107b. As described above, the half wave plate 102, and the diffraction grating 105 (and the half wave plate integrally formed with the diffraction grating 105) are disposed at such positions that a part of each of BD light, CD light and DVD light is reflected on the PBS surface 107b.

When the diffraction grating 105 is disposed at the position as described above, a main beam and two sub beams of CD light, and a main beam and two sub beams of DVD light are respectively aligned along the tracks of CD and DVD. The main beam and the two sub beams reflected on CD are irradiated onto four-divided sensors for CD on the photodetector 120, which will be described later. The main beam and two sub beams reflected on DVD are irradiated onto four-divided sensors for DVD on the photodetector 120, which will be described later.

BD light, CD light, DVD light reflected on the PBS surface 107b is irradiated onto the front monitor 108. The front monitor 108 outputs a signal in accordance with a received light amount. The signal from the front monitor 108 is used for emission power control of the semiconductor laser 101 and the dual wavelength laser 104.

The collimator lens 109 converts BD light, CD light and DVD light entered from the side of the complex prism 107 into parallel light. The driving mechanism 110 moves the collimator lens 109 in the optical axis direction in accordance with a control signal for aberration correction. The driving mechanism 110 is provided with a holder 110a for holding the collimator lens 109, and a gear 110b for feeding the holder 110a in the optical axis direction of the collimator lens 109. The gear 110b is interconnected to a driving shaft of a motor 110c.

BD light, CD light and DVD light collimated by the collimator lens 109 are reflected on the two reflection mirrors 111, 112, and are entered into the quarter wave plate 113. The quarter wave plate 113 converts BD light, CD light and DVD light entered from the side of the reflection mirror 112 into circularly polarized light, and converts BD light, CD light and DVD light entered from the side of the rise-up mirror 114 into a linearly polarized light whose polarization direction is orthogonal to the polarization direction upon incidence from the side of the reflection mirror 112. With this operation, light reflected on a disc is reflected on the PBS surface 107b.

The rise-up mirror 114 is a dichroic mirror. The rise-up mirror 114 transmits BD light, and reflects CD light and DVD light in a direction toward the dual wavelength objective lens 116. The rise-up mirror 115 reflects BD light in a direction toward the BD objective lens 117.

The dual wavelength objective lens 116 is configured to properly focus CD light and DVD light on CD and DVD, respectively. Further, the BD objective lens 117 is configured to properly focus BD light on BD. The dual wavelength objective lens 116 and the BD objective lens 117 are driven by an objective lens actuator 132 in a focus direction and in a tracking direction, while being held on the holder 110a.

The spectral element 118 has a stepped diffraction pattern (a diffraction hologram) on an incident surface thereof. Out of BD light, CD light and DVD light entered into the spectral element 118, BD light is divided into twelve light fluxes, which will be described later, and the propagating direction of each of the light fluxes is changed by diffraction on the spectral element 118. Main parts of CD light and DVD light are transmitted through the spectral element 118 without diffraction on the spectral element 118. An arrangement of the spectral element 118 will be described later referring to FIG. 11A.

The anamorphic lens 119 imparts astigmatism to BD light, CD light and DVD light entered from the side of the spectral element 118. The anamorphic lens 119 corresponds to the anamorphic lens shown in FIG. 1B. BD light, CD light and DVD light transmitted through the anamorphic lens 119 are entered into the photodetector 120. The photodetector 120 has a sensor layout for receiving the respective light. The sensor layout of the photodetector 120 will be described later referring to FIG. 12.

FIG. 11A is a diagram showing an arrangement of the spectral element 118. FIG. 11A is a plan view of the spectral element 118, when viewed from the side of the complex prism 107. FIG. 11A also shows the flat surface direction, the curved surface direction of the anamorphic lens 119, and a direction of a track image of laser light to be entered into the spectral element 118.

The spectral element 118 is made of a square transparent plate, and has a stepped diffraction pattern (a diffraction hologram) on a light incident surface thereof. The diffraction pattern is a stepped diffraction pattern. The step number and the step height of the diffraction pattern are set such that plus first order diffraction efficiency with respect to the wavelength of BD light is set high, and that zero-th order diffraction efficiency with respect to the wavelengths of CD light and DVD light is set high.

As shown in FIG. 11A, the light incident surface of the spectral element 118 is divided into sixteen diffraction areas 118a0 through 118h0, 118a1 through 118h1. The spectral element 118 is disposed at such a position that BD light is uniformly entered into each of the diffraction areas 118a0 through 118h0, 118a1 through 118h1. Specifically, the spectral element 118 is disposed at such a position that the center of the spectral element 118 shown in FIG. 11A is aligned with the optical axis of BD light.

As shown in FIG. 11A, an area (hereinafter, called as a "vertically oriented area") obtained by combining the diffraction areas 118a1, 118d1, 118e1, 118h1 extends in a direction perpendicular to the direction of a track image of laser light, and has a width d. An area (hereinafter, called as a "transversely oriented area") obtained by combining the diffraction areas 118b1, 118c1, 118f1, 118g1 extends in a direction in parallel to the direction of a track image of laser light, and has a width d.

FIG. 11B is a diagram showing light flux areas a0 through h0, a1 through h1 of BD light which is entered into the diffraction areas 118a0 through 118h0, 118a1 through 118h1 of the spectral element 118. Light passing through light flux areas a0 through h0, a1 through h1 is respectively entered into the diffraction areas 118a0 through 118h0, 118a1 through 118h1.

Referring back to FIG. 11A, the diffraction areas 118a0 through 118h0 diffract entered BD light in directions Va0 through Vh0 by plus first order diffraction. The directions Va0, Vh0, the directions Vf0, Vg0, the directions Vb0, Vc0, the directions Vd0, Ve0 respectively coincide with the directions Da through Dd shown in FIG. 4A. Further, each of the diffraction areas 118a0 through 118h0 diffracts BD light by the same diffraction angle by plus first order diffraction. The diffraction angle is adjusted by the pitch of a diffraction pattern.

The diffraction areas 118a1 through 118h1 diffract entered BD light in directions Va1 through Vh1 by plus first order diffraction. As shown in FIG. 11A, the directions Va1 through Vh1 are inclined by 45° with respect to the directions Va0 through Vh0. Further, as shown in FIG. 11A, the directions Va1, Vd1, the directions Ve1, Vh1 are respectively directions in parallel to the flat surface direction and different from each other; and the directions Vb1, Vg1, the directions Vc1, Vf1 are respectively directions in parallel to the curved surface direction and different from each other. The pitch of the diffraction pattern on the diffraction areas 118a1 through 118h1 is set smaller than the pitch of the diffraction pattern on the diffraction areas 118a0 through 118h0. With this arrangement, the diffraction angle of BD light diffracted on the diffraction areas 118a1 through 118h1 is set larger than the diffraction angle of BD light diffracted on the diffraction areas 118a0 through 118h0.

With use of the spectral element 118 having the above configuration, BD light diffracted on the diffraction areas 118a0 through 118h0 is irradiated onto the light receiving surface of the photodetector 120, as shown in FIG. 4B. Further, as will be described later, BD light diffracted on the diffraction areas 118a1 through 118h1 is irradiated onto a position on the outside of a rectangle defined by vertices on the outside of the sensor layout, on the light receiving surface of the photodetector 120. CD light and DVD light are irradiated onto four-divided sensors on the photodetector 120, which will be described later, substantially without diffraction on the diffraction areas 118a0 through 118h0, 118a1 through 118h1.

The diffraction areas 118a0 through 118h0, 118a1 through 118h1 are formed by e.g. a diffraction pattern having eight steps. In this case, the step difference per step is set to 7.35 μm. With this arrangement, it is possible to set the diffraction efficiencies of zero-th order diffraction light of CD light and DVD light to 99% and 92% respectively, while keeping the diffraction efficiency of plus first order diffraction light of BD light to 81%. In this case, zero-th order diffraction efficiency of BD light is set to 7%.

Alternatively, it is possible to set the number of steps of a diffraction pattern to be formed in the diffraction areas 118a0 through 118h0, 118a1 through 118h1 to the number other than eight. Furthermore, it is possible to configure the diffraction areas 118a0 through 118h0, 118a1 through 118h1 by using e.g. the technology disclosed in Japanese Unexamined Patent Publication No. 2006-73042. Using the above technology enables to more finely adjust diffraction efficiencies of BD light, CD light, and DVD light.

Figure 12:
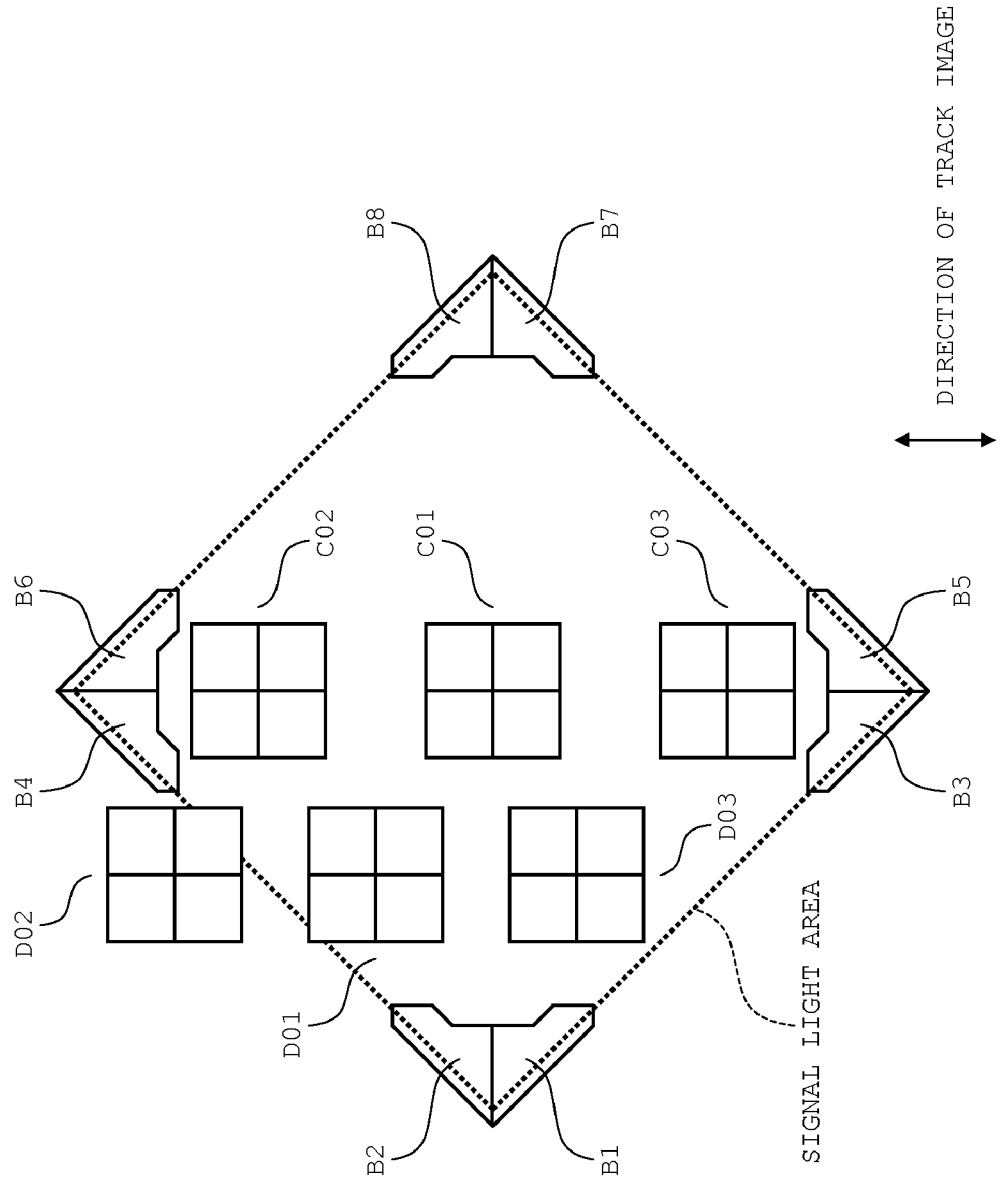
FIG. 12 is a diagram showing a sensor layout of a photodetector in the inventive example.

FIG. 12 is a diagram showing a sensor layout of the photodetector 120.

The photodetector 120 has sensors B1 through B8 for BD and for receiving BD light separated by the spectral element 118; four-divided sensors C01 through C03 for CD and for receiving CD light transmitted through the spectral element 118 without separation by the spectral element 118; and four-divided sensors D01 through D03 for DVD and for receiving DVD light transmitted through the spectral element 118 without separation by the spectral element 118. Signal light of BD light separated by the spectral element 118 is respectively irradiated onto vertex portions of the signal light area, in the same manner as the irradiation area of signal light shown in FIG. 4B.

As shown in FIG. 12, the sensors B1, B2, the sensors B3, B5, the sensors B4, B6, the sensors B7, B8 are respectively disposed near the four vertices of the signal light area to receive signal light of BD light passing through the light flux areas a0 through h0, respectively. The sensors B1 through B8 are disposed at such positions that the irradiation area of BD light which is positioned on the inside of the four vertex portions of the signal light area is sufficiently included. With this arrangement, it is possible to sufficiently receive signal light separated by the spectral element 118 by the sensors B1 through B8, even in the case where the positions of the sensors B1 through B8 are displaced resulting from e.g. aging deterioration.

The optical axes of BD light and CD light are aligned with each other on the dichroic surface 107a as described above. Accordingly, a main beam (zero-th order diffraction light) of CD light is irradiated onto a center of the signal light area of BD light, on the light receiving surface of the photodetector 120. The four-divided sensor C01 is disposed at the center position of a main beam of CD light. The four-divided sensors C02, C03 are disposed in the direction of a track image with respect to a main beam of CD light, on the light receiving surface of the photodetector 120, to receive sub beams of CD light.

Since the optical axis of DVD light is displaced from the optical axis of CD light as described above, a main beam and two sub beams of DVD light are irradiated at positions displaced from the irradiation positions of a main beam and two sub beams of CD light, on the light receiving surface of the photodetector 120. The four-divided sensors D01 through D03 are respectively disposed at the irradiation positions of a main beam and two sub beams of DVD light. The distance between a main beam of CD light and a main beam of DVD light is determined by the gap G between emission points of CD light and DVD light shown in FIG. 10C.

FIGS. 13A through 13C are schematic diagrams showing irradiation areas of BD light, in the case where BD light passing through the sixteen light flux areas a0 through h0, a1 through h1 shown in FIG. 11B is irradiated onto the sensors B1 through B8 shown in FIG. 12. FIGS. 13A through 13C are diagrams respectively showing signal light, stray light 1 and stray light 2 of BD light that is irradiated onto the sensors B1 through B8, in the case where the focus position of BD light is adjusted on a target recording layer. To simplify the description, the irradiation areas of BD light passing through the light flux areas a0 through h0, a1 through h1 are indicated as irradiation areas a0 through h0, a1 through h1 in each of the drawings of FIGS. 13A through 13C. Further, to simplify the description, the shape of the sensors B1 through B8 shown in FIGS. 13A through 13C is simplified in comparison with the shape of the sensors B1 through B8 shown in FIG. 12.

As shown in FIG. 13A, signal light of BD light passing through the light flux areas a0 through h0 is irradiated onto the sensors B1 through B8, and signal light of BD light passing through the light flux areas a1 through h1 is irradiated onto a position away from the signal light area. Out of signal light of BD light to be entered into the spectral element 118, signal light of BD light to be entered into the diffraction areas 118a1 through 118h1 is diffracted with a large diffraction angle toward the outside of the signal light area. As a result of the above operation, out of signal light of BD light to be entered into the spectral element 118, only signal light of BD light to be entered into the diffraction areas 118a0 through 118h0 is irradiated onto the sensors B1 through B8. In this arrangement, the irradiation areas a0, h0, the irradiation areas b0, c0, the irradiation areas f0, g0, and the irradiation areas d0, e0 each has a shape obtained by removing a center portion from a corresponding one of the four irradiation areas (see FIG. 7B) obtained in the case where the spectral element H is used, depending on the width d shown in FIG. 11A.

As shown in FIGS. 13B, 13C, stray light 1, 2 of BD light passing through the light flux areas a0 through h0, a1 through h1 are irradiated onto a position on the outside of the signal light area. In this case, there is formed a clearance between the irradiation areas a0, h0, and likewise, there is formed a clearance between the irradiation areas b0, c0, between the irradiation areas f0, g0, the irradiation areas d0, e0. The clearance is formed depending on the width d shown in FIG. 11A. Specifically, the irradiation areas a0, h0, the irradiation areas b0, c0, the irradiation areas f0, g0, the irradiation areas d0, e0 each has a shape obtained by removing a boundary portion between the respective two irradiation areas from a corresponding one of the irradiation areas in the state shown in FIGS. 7C, 7D obtained in the case where the spectral element H is used, by the diffraction areas 118a1 through 118h1 shown in FIG. 11A. As shown in FIGS. 13B, 13C, these clearances extend near the vertices of the signal light area. With this arrangement, there is no or less likelihood that stray light 1, 2 may be entered into the sensors near the vertices of the signal light area.

Next, described is an output signal from each sensor, in the case where the positions of the sensors P11 through P18 are displaced in the inventive example.

Figure 14C:
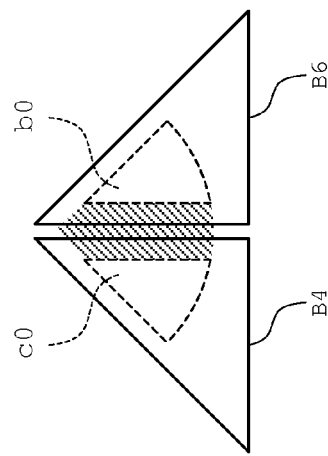
FIGS. 14A through 14F are diagrams for describing an output signal from each sensor resulting from positional displacement of a sensor in an inventive example.
Figure 14B:
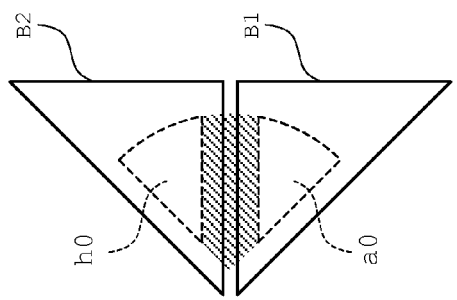
Figure 14A:
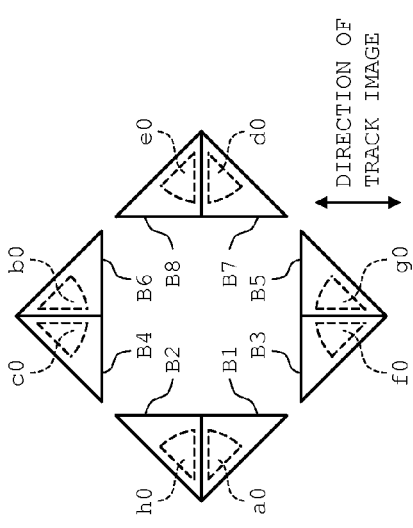

FIG. 14A is a diagram showing an irradiation area of signal light passing through the light flux areas a0 through h0, in the case where the positions of the sensors B1 through B8 are not displaced. FIG. 14A shows a state that the focus position of laser light is adjusted on a target recording layer. In this case, as shown in FIG. 14A, signal light passing through the light flux areas a0 through h0 is uniformly irradiated onto each of the sensors. There is formed a slight clearance between the sensors B1, B2, between the sensors B4, B6, between the sensors B3, B5, between the sensors B7, B8.

FIGS. 14B, 14C are enlarged views showing an irradiation area near the sensors B1, B2, and an irradiation area near the sensors B4, B6, respectively, in the case shown in FIG. 14A. The hatched portions in between the irradiation areas in FIGS. 14B, 14C respectively indicate areas, with signal light being removed by the diffraction areas 118a1, 118h1, the diffraction areas 118b1, 118c1 of the spectral element 118. Specifically, in the case where the spectral element H is used in place of the spectral element 118, BD light passing through the light flux areas a, h, and the light flux areas b, c is irradiated onto areas obtained by adding the hatched portions to the broken-line portions.

As shown in FIG. 14B, the irradiation area a0 has a shape with an upper end of the irradiation area a shown in FIG. 8B being removed, and the irradiation area h0 has a shape with a lower end of the irradiation area h shown in FIG. 8B being removed. The irradiation areas a0, h0 respectively and uniformly overlap the sensors B1, B2. Further, as shown in FIG. 14C, the irradiation area b0 has a shape with a left end of the irradiation area b shown in FIG. 8C being removed, and the irradiation area c0 has a shape with a right end of the irradiation area c shown in FIG. 8C being removed. The irradiation areas b0, c0 respectively and uniformly overlap the sensors B6, B4. Likewise, the irradiation areas f0, g0 respectively and uniformly overlap the sensors B3, B5, and the irradiation areas d0, e0 respectively and uniformly overlap the sensors B7, B8.

Figure 14F:
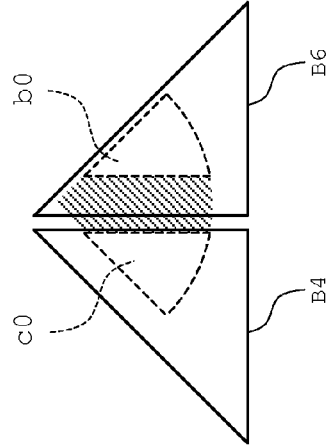
Figure 14E:
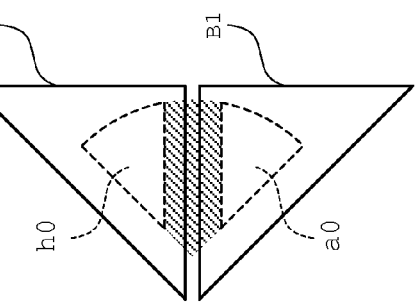
Figure 14D:
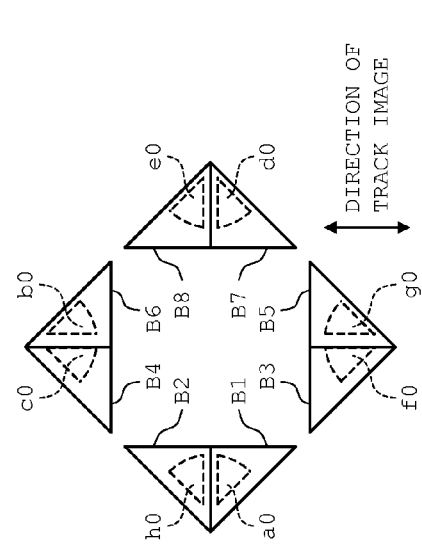

FIG. 14D is a diagram showing an irradiation area of signal light passing through the light flux areas a0 through h0, in the case where the positions of the sensors B1 through B8 are displaced from the state shown in FIG. 14A in a direction (leftward or rightward direction) perpendicular to the direction of a track image. In this case, as shown in FIG. 14D, although the irradiation areas are the same as those in the state shown in FIG. 14A, since the positions of the sensors B1 through B8 are displaced leftward, the irradiation areas in FIG. 14D are displaced rightward within the sensors B1 through B8.

FIG. 14E is an enlarged view showing irradiation areas near the sensors B1, B2 in the state shown in FIG. 14D. As shown in FIG. 14E, the irradiation areas a0, h0 respectively and uniformly overlap the sensors B1, B2 in the same manner as the state shown in FIG. 14B, although the irradiation areas a0, h0 are respectively shifted rightward with respect to the sensors B1, B2. Accordingly, the output signals from the sensors B1, B2 in FIG. 14E are substantially the same as the output signals from the sensors B1, B2 in the state shown in FIG. 14A. Likewise, the output signals from the sensors B7, B8 in FIG. 14E are substantially the same as the output signals from the sensors B7, B8 in the state shown in FIG. 14A.

FIG. 14F is an enlarged view showing irradiation areas near the sensors B4, B6 in the state shown in FIG. 14D. As shown in FIG. 14F, the irradiation area b0 lies within the sensor B6 in the same manner as the state shown in FIG. 14C. Further, the irradiation area c0 lies within the sensor B4 in the same manner as the state shown in FIG. 14C. Accordingly, the output signals from the sensors B4, B6 in FIG. 14F are respectively substantially the same as the output signals from the sensors B4, B6 in the state shown in FIG. 14A. Likewise, the output signal from the sensors B3, B5 in FIG. 14F are respectively substantially the same as the output signals from the sensors B3, B5 in the state shown in FIG. 14A.

Further, in the case where the positions of the sensors B1 through B8 are displaced rightward substantially by the same displacement amount as the state shown in FIG. 14D, the output signals from the sensors B1 through B8 are kept substantially unchanged in the same manner as the states shown in FIGS. 14D through 14F. Accordingly, even if the positions of the sensors B1 through B8 are displaced in a direction (upward or downward direction) in parallel to the direction of a track image substantially by the same displacement amount as the state shown in FIG. 14D, the output signals from the sensors B1 through B8 are kept substantially unchanged.

In the above arrangement, it is preferable to set the clearance between the respective two irradiation areas positioned at four vertex portions of the signal light area larger than the clearance between the respective two sensors corresponding to the respective two irradiation areas so as to keep the output signals from the sensors B1 through B8 substantially unchanged, even if the positions of the sensors B1 through B8 are displaced. The clearance between the respective two irradiation areas is properly adjusted by the width d shown in FIG. 11A.

Next, there is described an arrangement of the inventive example in the case where the approach of suppressing an offset (a DC component) of a push-pull signal resulting from positional displacement of a sensor, as described above referring to FIG. 9.

In the inventive example, as shown in FIGS. 14D through 14F, even in the case where the positions of the sensors B1 through B8 are displaced in a direction in parallel to the direction of a track image, and in a direction perpendicular to the direction of a track image, the output signals from the sensors B1 through B8 are kept substantially unchanged. Accordingly, as shown in FIGS. 14D through 14F, even in the case where the positions of the sensors B1 through B8 are displaced in a direction (leftward or rightward direction) perpendicular to the direction of a track image, unlike the case where the spectral element H is used, signals from the adder circuits 14, 15 shown in FIG. 9 are balanced. In this case, it is not specifically necessary to set the gains α, β in order to adjust the signal imbalance.

Next, FIGS. 15A through 15D show simulation results of irradiation areas on the sensor layout, in the case where the spectral element H is used, and in the case where the spectral element 118 in the inventive example is used.

FIG. 15A shows a distribution state of signal light, stray light 1, 2 on the light receiving surface, in the case where the spectral element H shown in FIG. 7A is used, and FIG. 15B is an enlarged view of a right vertex portion in the state shown in FIG. 15A. FIG. 15C shows a distribution state of signal light, stray light 1, 2 on the light receiving surface, in the case where the spectral element 118 is used, and FIG. 15D is an enlarged view of a right vertex portion in the state shown in FIG. 15C. FIGS. 15A through 15D respectively show simulation results in the case where there is no lens shift.

FIG. 16A shows a distribution state of signal light, stray light 1, 2 on the light receiving surface, in the case where the spectral element H is used, and FIG. 16B is an enlarged view of a right vertex portion in the state shown in FIG. 16A. FIG. 16C shows a distribution state of signal light, stray light 1, 2 on the light receiving surface, in the case where the spectral element 118 is used, and FIG. 16D is an enlarged view of a right vertex portion in the state shown in FIG. 16C. FIGS. 16A through 16D respectively show simulation results in the case where a lens is shifted by 300 μm.

In the above simulation, the width d of the spectral element 118 is set to 10% of the diameter of laser light to be entered into the spectral element 118. Further, the above simulation is made based on the premise that the BD objective lens 117 is not shifted in FIGS. 15A through 15D, and that the BD objective lens 117 is shifted by 300 μm in FIGS. 16A through 16D. Furthermore, in the above simulation, a light receiving sensor is constituted of the sensors B1 through B8 in the inventive example.

As shown in FIGS. 15A and 15B, FIGS. 16A and 16B, in the case where the spectral element H is used, the irradiation area of stray light comes close to the irradiation area of signal light. As a result, stray light is likely to be entered into the sensors B1 through B8. In contrast, as shown in FIGS. 15C and 15D, FIGS. 16C and 16D, in the case where the spectral element 118 in the inventive example is used, there is no or less likelihood that stray light may be entered into the sensors B1 through B8, because irradiation areas of stray light which entered to the positions near the vertices of the signal light area, are removed by diffraction on the diffraction areas 118a1 through 118h1 shown in FIG. 11A, as compared with the case where the spectral element H is used.

As described above, in the inventive example, there is no or less likelihood that stray light 1, 2 may be superimposed on signal light of BD light, as compared with the case where the spectral element H is used. Thus, the inventive example is advantageous in enhancing the precision of output signals from the sensors B1 through B8 based on signal light of BD light.

Further, in the inventive example, as shown in FIGS. 14D through 14F, even if the positions of the sensors B1 through B8 are displaced, the output signal from each sensor is kept substantially unchanged, as compared with the case where the spectral element H is used. Thus, the inventive example is advantageous in enhancing the precision of output signals from the sensors B1 through B8, even if the positions of the sensors B1 through B8 are displaced.

Furthermore, in the inventive example, in the case where the approach (see FIG. 9) of suppressing an offset (a DC component) of a push-pull signal resulting from positional displacement of a sensor is used, as shown in FIGS. 14D through 14F, even if the positions of the sensors B1 through B8 are displaced, signals from the adder circuit 14, 15 shown in FIG. 9 are balanced, unlike the case where the spectral element H is used. Thus, there is no or less necessity that the gains α, β be set each time the positions of the sensors P11 through P18 are displaced in leftward or rightward direction resulting from e.g. aging deterioration, once the gains α, β are set.

The inventive example is advantageous even in the case where a positional displacement amount of the sensors B1 through B8 is larger than the positional displacement amount shown in FIG. 14D, and the signal light area to be formed by signal light of BD light is deviated from a rectangle defined by the vertices on the outside of the sensor layout. Specifically, in the inventive example, even in the case where positional displacement of the sensors B1 through B8 is large, the amount by which each of the irradiation areas is deviated from a corresponding sensor, and the amount by which each of the irradiation areas overlaps a sensor adjacent to the corresponding sensor are decreased, as compared with the case where the spectral element H is used. Thus, it is possible to enhance the precision of output signals from the sensors B1 through B8 in the above case, as compared with the case where the spectral element H is used. Further, since imbalance of signals from the adder circuits 14, 15 shown in FIG. 9 is reduced in the above case, it is possible to set the gains α, β to a small value. As described above, in the inventive example, since the gains α, β can be set to a small value, as compared with the case where the spectral element H shown in FIG. 7A is used, noise is not excessively amplified, even if the noise is superimposed on the signal PP2L, PP2R. Thus, it is possible to obtain a satisfactory push-pull signal PP.

The example of the invention has been described as above. The invention is not limited to the foregoing example, and the example of the invention may be modified in various ways other than the above.

For instance, in the inventive example, as shown in FIG. 11A, BD light is diffracted on diffraction areas adjacent to each other, out of the diffraction areas 118a1 through 118h1, in the flat surface direction or the curved surface direction, and in directions different form each other. Alternatively, the diffraction direction may be set, as necessary, in such a manner that diffracted BD light is not irradiated onto the sensors B1 through B8. Further alternatively, diffraction areas adjacent to each other, out of the diffraction areas 118a1 through 118h1, may be integrally formed into one diffraction area. In the above case, the diffraction direction may also be set, as necessary, in such a manner that diffracted BD light is not irradiated onto the sensors B1 through B8.

Furthermore, in the inventive example, the vertically oriented area and the transversely oriented area having the width d are formed along straight lines inclined from the flat surface direction and from the curved surface direction by 45°. Alternatively, the vertically oriented area and the transversely oriented area may be formed with a light blocking portion where incidence of laser light is blocked. In the above case, signal light of BD light is irradiated onto the sensors B1 through B8 in the same manner as the inventive example. In this case, the light amount of CD light to be irradiated onto the four-divided sensors C01 through C03, and the light amount of DVD light to be irradiated onto the four-divided sensors D01 through D03 are reduced by the light blocking portions. In the case where the reduction in the light amount of CD light and DVD light causes a problem, the optical system for receiving BD light, and the optical system for receiving CD light and DVD light may be individually constructed.

Further, in the inventive example, BD light is separated by the spectral element 118 having a diffraction pattern on a light incident surface thereof. Alternatively, BD light may be separated by using a spectral element constituted of a multifaceted prism.

In the case where a spectral element constituted of a multifaceted prism is used, the optical system for receiving BD light, and the optical system for receiving CD light and DVD light are individually constructed. Specifically, BD light is guided to the BD objective lens 117 shown in FIG. 10B by the optical system for BD, and CD light and DVD light are guided to the dual wavelength objective lens 116 by the optical system for CD/DVD which is constructed independently of the optical system for BD. The optical system for BD has a laser light source for emitting BD light, and one photodetector for receiving BD light reflected on BD. The optical system for CD/DVD has a laser light source for emitting CD light and DVD light, and a photodetector other than the photodetector for BD light and for receiving CD light, DVD light reflected on CD, DVD. The photodetector for CD/DVD has two sensor groups for individually receiving CD light and DVD light. Similarly to the inventive example, the optical system for BD is provided with an anamorphic lens for imparting astigmatism to BD light reflected on BD. The spectral element constituted of a multifaceted prism is disposed, for example, anterior to the anamorphic lens.

FIGS. 17A, 17B are schematic diagrams showing an arrangement of a spectral element 121 constituted of a multifaceted prism. FIG. 17A is a perspective view of the spectral element 121, and FIG. 17B is a plan view of the spectral element 121 when viewed from an incident surface thereof.

Referring to FIGS. 17A, 17B, the spectral element 121 is constituted of a multifaceted prism. Surfaces 121*a* through 121*d* each inclined in a direction different from the optical axis of BD light are formed on the incident surface of the spectral element 121. BD light is entered into the spectral element 121 in such a manner that the optical axis of BD light is aligned with the center of the spectral element 121. With this arrangement, BD light is uniformly entered into the surfaces 121*a* through 121*d*. BD light entered into the surfaces 121*a* through 121*d* is respectively refracted on the surfaces 121*a* through 121*d* in the directions Va through Vd, and the propagating directions of BD light are changed by the same angle. The directions Va through Vd coincide with the directions Da through Dd shown in FIG. 4A, respectively.

Referring to FIG. 17B, the output surface of the spectral element 121 is formed with a light blocking portion 121*e* having a width d and formed in parallel to the direction of a track image of entered light, and a light blocking portion 121*f* having a width d and formed in a direction perpendicular to the direction of a track image of entered light. The light blocking portions 121*e*, 121*f* are formed by e.g. attaching a light blocking mask member on a flat output surface thereof. With this arrangement, a part of BD light to be entered into the surfaces 121*a* through 121*d* is blocked by the light blocking portions 121*e*, 121*f*. Specifically, BD light to be entered into areas 121*a*1, 121*a*2 within the surface 121*a*, areas 121*b*, 121*b*2 within the surface 121*b*, areas 121*c*1, 121*c*2 within the surface 121*c*, areas 121*d*1, 121*d*2 within the surface 121*d* is not blocked by the light blocking portions 121*e*, 121*f*. As a result, the irradiation areas of signal light and stray light 1, 2 that have been transmitted through the spectral element 121 are formed near the signal light area, as indicated by the irradiation areas a0 through h0 shown in FIGS. 13A through 13C. In this case, the irradiation areas a1 through h1 are not formed by light blocking by the light blocking portions 121*e*, 121*f*.

In the modification example shown in FIGS. 17A, 17B, the surfaces 121*a* through 121*d* are formed on an incident surface of the spectral element 121, and the light blocking portions 121*e*, 121*f* are formed on a flat output surface of the spectral element 121. Alternatively, the surfaces 121*a* through 121*d* may be formed on an output surface of the spectral element 121, and the light blocking portions 121*e*, 121*f* may be formed on a flat incident surface of the spectral element 121. Further alternatively, a slope capable of obtaining refraction substantially equivalent to diffraction by the diffraction areas 118*a*1 through 118*h*1 of the spectral element 118 may be formed, in place of the light blocking portions 121*e*, 121*f*.

Further, in the inventive example, as shown in FIG. 11A, the vertically oriented area and the transversely oriented area of the spectral element 118 are configured to have the width d. Alternatively, the vertically oriented area and the transversely oriented area of the spectral element 118 may be configured to have widths different from each other.

FIG. 18A is a diagram showing an arrangement of the spectral element 118 whose vertically oriented area and transversely oriented area have widths different from each other. In the modified spectral element 118, the width d' of the vertically oriented area is set smaller than the width d of the transversely oriented area. As shown in FIG. 18A, a lower end of the diffraction areas 118*a*1, 118*h*1, and an upper end of the diffraction areas 118*d*1, 118*e*1 have a pointed-arrow shape.

FIG. 18B is a diagram showing light flux areas a0 through h0, a1 through h1 of BD light that is entered into diffraction areas 118*a*0 through 118*h*0, 118*a*1 through 118*h*1 of the modified spectral element 118.

As compared with the spectral element 118 shown in FIG. 11A, in the case where the modified spectral element 118 is used, the light flux areas a0, d0, e0, h0 are increased, and the light flux areas a1, d1, e1, h1 are decreased. With this arrangement, when the focus position of BD light is adjusted on a track of a target recording layer, the irradiation areas b0, c0, f0, g0 by the spectral element 118 shown in FIG. 18A are the same as those in the state shown in FIG. 13A, and the irradiation areas a0, d0, e0, h0 by the spectral element 118 shown in FIG. 18A are increased substantially by the same amount, as compared with the state shown in FIG. 13A. Further, a clearance to be formed between the irradiation areas b0, c0 in the above case, and a clearance to be formed between the irradiation areas f0, g0 in the above case are the same as those in the state shown in FIG. 13A; and a clearance to be formed between the irradiation areas a0, h0 in the above case, and a clearance to be formed between the irradiation areas d0, e0 in the above case are decreased, as compared with the state shown in FIG. 13A.

With the above arrangement, as shown in e.g. FIG. 14D, even in the case where the positions of the sensors B1 through B8 are displaced in a direction perpendicular to the direction of a track image, the irradiation areas on the sensors B1, B2, B7, B8 with less influence by the displacement are set larger than those in the inventive example. Then, the precision of output signals from the sensors B1, B2, B7, B8 are further enhanced as compared with the inventive example, while enhancing the precision of output signals from the sensors B3 through B6 in the same manner as the inventive example.

In the above modification example, since the width d' of the vertically oriented area is set smaller than the width d of the transversely oriented area, the irradiation areas a0, d0, e0, h0 are set larger than those in the state shown in FIG. 13A substantially by the same amount. As a result, the output signals from the sensors B1, B2, B7, B8 are also increased as compared with the state shown in FIG. 13A substantially by the same amount. However, since the increased amounts of output signals from the sensors B1, B2, B7, B8 are offset with each other in the equations (1), (2), there is no likelihood that such an increase may affect the focus error signal FE and the push-pull signal PP. Accordingly, even in the case where the spectral element 118 shown in FIG. 18A is used, it is possible to use the focus error signal FE and the push-pull signal PP expressed by the equations (1), (2).

As described above, in the case where the sensors B1 through B8 are likely to be greatly displaced in a direction perpendicular to the direction of a track image resulting from e.g. aging deterioration, it is desirable to configure the spectral element 118 in such a manner that the width of the transversely oriented area is set larger than the width of the vertically oriented area. Further, in the case where the sensors B1 through B8 are likely to be greatly displaced in the direction of a track image resulting from e.g. aging deterioration, it is desirable to configure the spectral element 118 in such a manner that the width of the vertically oriented area is set larger than the width of the transversely oriented area. Furthermore, it is desirable to properly set the widths of the vertically oriented area and the transversely oriented area, in accordance with on a direction in which the sensors B1 through B8 are likely to be displaced.

In the case where there is no or less likelihood that the positions of the sensors B1 through B8 may be displaced in the direction of a track image or in a direction perpendicular to the direction of a track image, the width of the transversely oriented area or of the vertically oriented area may be set to zero.

FIG. 19A is a diagram showing an arrangement of a spectral element 122, in the case where the width of the vertically oriented area of the spectral element 118 is set to zero.

As shown in FIG. 19A, the spectral element 122 is formed with diffraction areas 122a through 122h. As shown in FIG. 19A, an area (a transversely oriented area) formed by combining the diffraction areas 122g, 112h has the width d. As shown in FIG. 19B, BD light passing through light flux areas a2 through h2 is respectively entered into the diffraction areas 122a through 122h of the spectral element 122. The diffraction areas 122a through 122h diffract entered BD light in the same manner as the diffraction areas 118a0, 118b0, 118c0, 118d0, 118f0, 118g0, 118b1, 118c1 of the spectral element 118 in the inventive example.

In the above case, the irradiation areas by the light flux areas b2, c2, e2, f2 are respectively coincident with the irradiation areas b0, c0, f0, g0 shown in FIG. 13A. Further, signal light of BD light passing through the light flux areas a2, d2 is respectively irradiated onto parts of the sensors B1, B2, and onto parts of the sensors B7, B8 in the same manner as the case where the spectral element H is used.

With the above arrangement, as shown in e.g. FIG. 14D, even in the case where the positions of the sensors B1 through B8 are displaced in a direction perpendicular to the direction of a track image, the precision of output signals from the sensors B3 through B6 are enhanced in the same manner as the inventive example. Further, since the irradiation areas on the sensors B1, B2, B7, B8 are increased, the precision of output signals from the sensors B1, B2, B7, B8 are further enhanced, as compared with the inventive example.

Further, in the above case, output signals from the sensors B1, B2, B7, B8 are also increased substantially by the same amount, in the same manner as the case where the spectral element 118 shown in FIG. 18A is used. However, the increased amounts of output signals are offset with each other in the equations (1), (2), there is no likelihood that such an increase may affect the focus error signal FE and the push-pull signal PP. Thus, in this case, it is also possible to use the focus error signal FE and the push-pull signal PP expressed by the equations (1), (2).

As described above, in the case where the positions of the sensors B1 through B8 are greatly displaced only in a direction perpendicular to the direction of a track image resulting from e.g. aging deterioration, it is desirable to configure the spectral element 118 in such a manner that the width of the vertically oriented area is set to zero. Further, in the case where the positions of the sensors B1 through B8 are greatly displaced only in the direction of a track image resulting from e.g. aging deterioration, it is desirable to configure the spectral element 118 in such a manner that the width of the transversely oriented area is set to zero.

Furthermore, in the inventive example, the spectral element 118 is disposed anterior to the anamorphic lens 119. Alternatively, the spectral element 118 may be disposed posterior to the anamorphic lens 119, or a diffraction pattern for imparting the same diffraction function as the spectral element 118 to laser light may be integrally formed on an incident surface or an output surface of the anamorphic lens 119.

The embodiment of the invention may be changed or modified in various ways as necessary, as far as such changes and modifications do not depart from the scope of the claims of the invention hereinafter defined.

What is claimed is:

1. An optical pickup device, comprising:
a light source which emits laser light;
an objective lens which focuses the laser light on a recording layer;
an astigmatism element which imparts astigmatism to reflected light of the laser light reflected on the recording layer;
a spectral element into which the reflected light is entered, and which separates the reflected light; and
a photodetector which receives the reflected light, wherein the astigmatism element converges the reflected light in a first direction and in a second direction perpendicular to the first direction so that the reflected light forms focal lines at different positions from each other, and the spectral element is divided into six second areas by a straight line in parallel to the first direction, a straight line in parallel to the second direction, and a first area having a predetermined width and formed along a straight line in parallel to a third direction inclined from the first direction by 45 degrees, and is configured to guide the reflected light passing through the six second areas to corresponding sensors on the photodetector while making propagating directions of the reflected light different from each other, and to avoid guiding the reflected light entered into the first area to the sensors.

2. The optical pickup device according to claim 1, wherein the spectral element is divided into the eight second areas by a third area having a predetermined width and formed along a straight line in parallel to a fourth direction perpendicular to the third direction, in addition to the straight line in parallel to the first direction, the straight line in parallel to the second direction, and the first area; and is configured to guide the reflected light passing through the eight second areas to the corresponding sensors on the photodetector while making the propagating directions of the reflected light different from each other, and to avoid guiding the reflected light entered into the first area and into the third area to the sensors.

3. The optical pickup device according to claim 2, wherein the spectral element changes the propagating directions of the reflected light to be entered into the first area and into the third area in such a manner that an angle by which the first area changes the propagating direction of the reflected light and an angle by which the third area changes the propagating direction of the reflected light are set larger than an angle by which the second area changes the propagating direction of the reflected light.

4. The optical pickup device according to claim 3, wherein the spectral element propagates the reflected light to be entered into each of areas obtained by dividing the first area into two parts by the straight line in parallel to the third direction, in directions different from each other, and propagates the reflected light to be entered into each of areas obtained by dividing the third area into two parts by the straight line in parallel to the fourth direction, in directions different from each other.

5. The optical pickup device according to claim 4, wherein the spectral element propagates the reflected light to be entered into each of the two areas obtained by dividing the first area by the straight line in parallel to the third direction, in directions in parallel to the first direction and different from each other, and propagates the reflected light to be entered into each of the two areas obtained by dividing the third area by the straight line in parallel to the fourth direction, in directions in parallel to the second direction and different from each other.

6. The optical pickup device according to claim 2, wherein the first area and the third area are so configured as to block the reflected light.

7. The optical pickup device according to claim 1, wherein the spectral element guides the reflected light passing through the second area to positions of four different vertices of a rectangle, on a light receiving surface of the photodetector.

* * * * *